US008677965B2

(12) United States Patent
Kato et al.

(10) Patent No.: US 8,677,965 B2
(45) Date of Patent: Mar. 25, 2014

(54) VALVE TIMING CONTROL DEVICE OF INTERNAL COMBUSTION ENGINE

(75) Inventors: Hiroyuki Kato, Kanagawa (JP); Seiji Tsuruta, Atsugi (JP); Kotaro Watanabe, Atsugi (JP); Yoshinori Ichinosawa, Atsugi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 263 days.

(21) Appl. No.: 13/080,239

(22) Filed: Apr. 5, 2011

(65) Prior Publication Data
US 2012/0017857 A1 Jan. 26, 2012

(30) Foreign Application Priority Data

Jul. 20, 2010 (JP) ................................. 2010-162433

(51) Int. Cl.
*F01L 9/00* (2006.01)
(52) U.S. Cl.
USPC ................ 123/179.4; 123/179.18; 123/90.12; 123/90.15
(58) Field of Classification Search
USPC .......... 123/90.12, 90.15, 90.17, 90.18, 90.19, 123/90.31, 179.4, 179.18
See application file for complete search history.

(56) References Cited

U.S. PATENT DOCUMENTS

| 5,924,395 | A * | 7/1999 | Moriya et al. | 123/90.15 |
| 6,523,511 | B2 * | 2/2003 | Hase | 123/90.17 |
| 8,215,272 | B2 * | 7/2012 | Takemura et al. | 123/90.15 |
| 2002/0139332 | A1 * | 10/2002 | Takenaka | 123/90.17 |
| 2009/0250028 | A1 | 10/2009 | Fujiyoshi et al. | |
| 2012/0174883 | A1 * | 7/2012 | Kokubo et al. | 123/90.15 |

FOREIGN PATENT DOCUMENTS

| JP | 2001-041012 | 2/2001 |
| JP | 2006-283704 | 10/2006 |
| JP | 2007-064127 | 3/2007 |
| JP | 2009250073 | 10/2009 |
| JP | 2010-179156 | 8/2010 |

OTHER PUBLICATIONS

JP Office Action for Japanese application No. 2010-162433, issued on Jun. 4, 2013.
U.S. Appl. No. 13/076,641, having a priority based on a Japanese Patent Application No. 2010-179156, filed in Japan on Aug. 10, 2010.

* cited by examiner

*Primary Examiner* — Hai Huynh
(74) *Attorney, Agent, or Firm* — Antonelli, Terry, Stout & Kraus, LLP.

(57) ABSTRACT

A valve timing control device comprises a drive rotation member driven by a crankshaft of an internal combustion engine; a driven rotation member fixed to a camshaft that actuates engine valves to open and close, the drive rotation member and driven rotation member being coaxially arranged to make a relative rotation therebetween; a phase varying mechanism that rotates the driven rotation member relative to the drive rotation member within a given angle, the phase varying mechanism being able to cause the driven rotation member to take the most-retarded phase position, the most-advanced phase position and a middle phase position defined between the most-retarded phase position and the most-advanced phase position; and a position keeping mechanism that is able to keep the driven rotation member at least the most-retarded phase position and the middle phase position at the time of starting the engine, and is able to select one of the most-retarded phase position and the middle phase position in accordance with an operation condition of the engine.

12 Claims, 15 Drawing Sheets

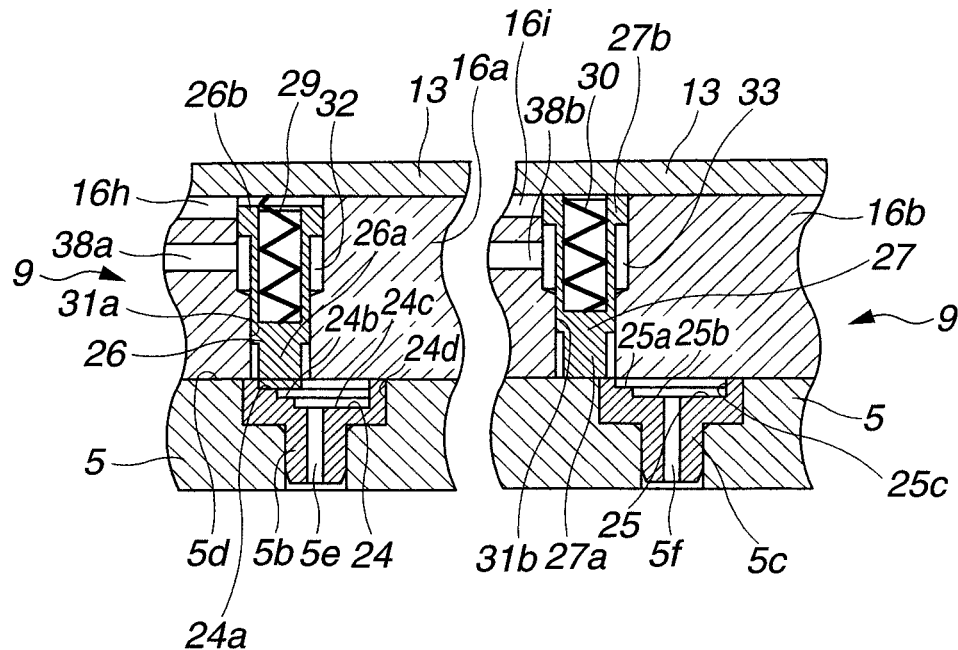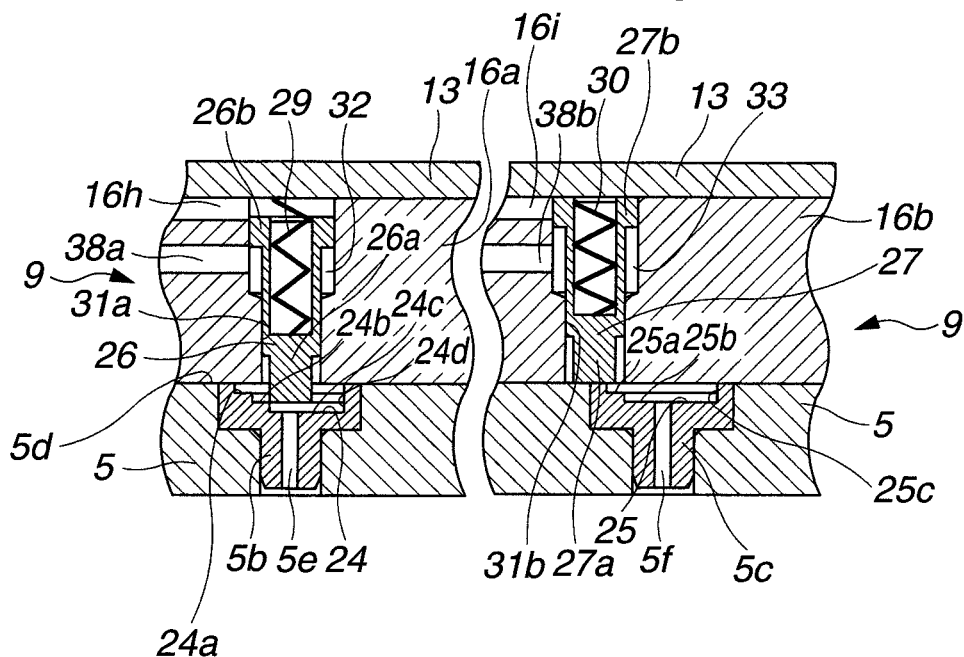

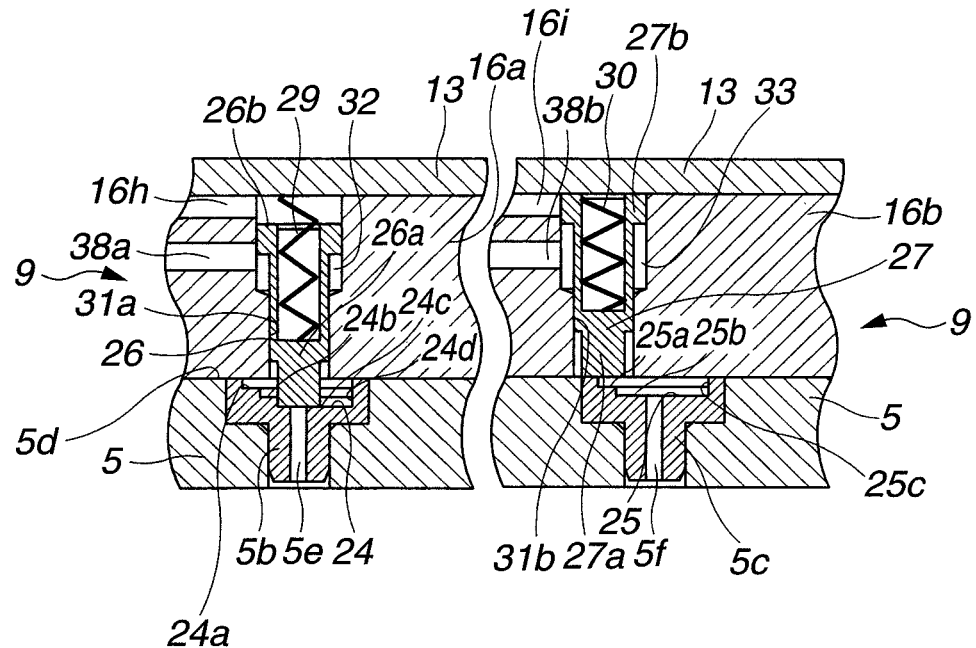
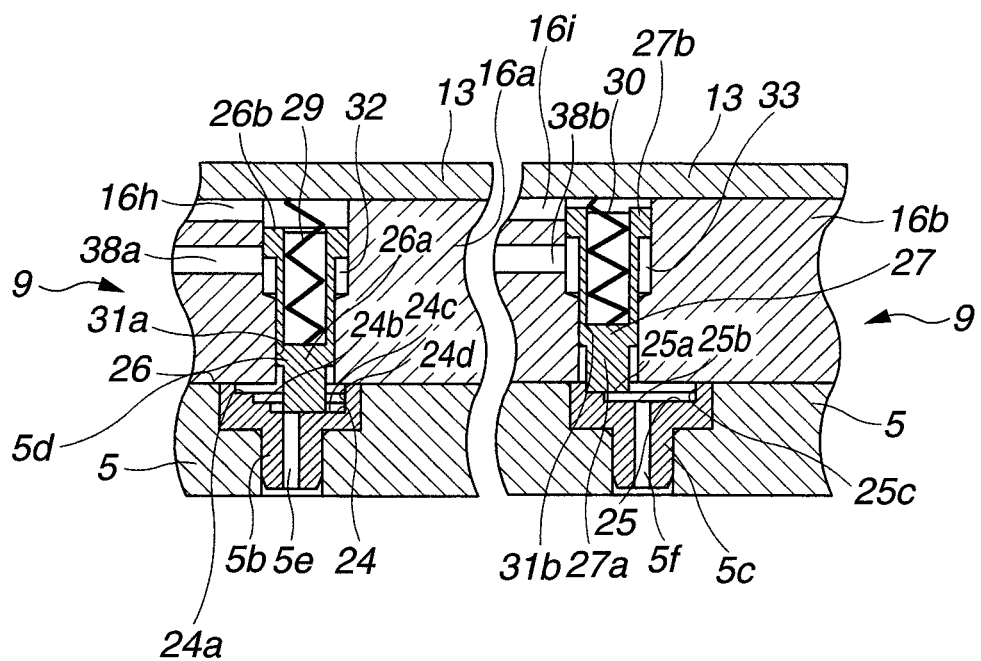

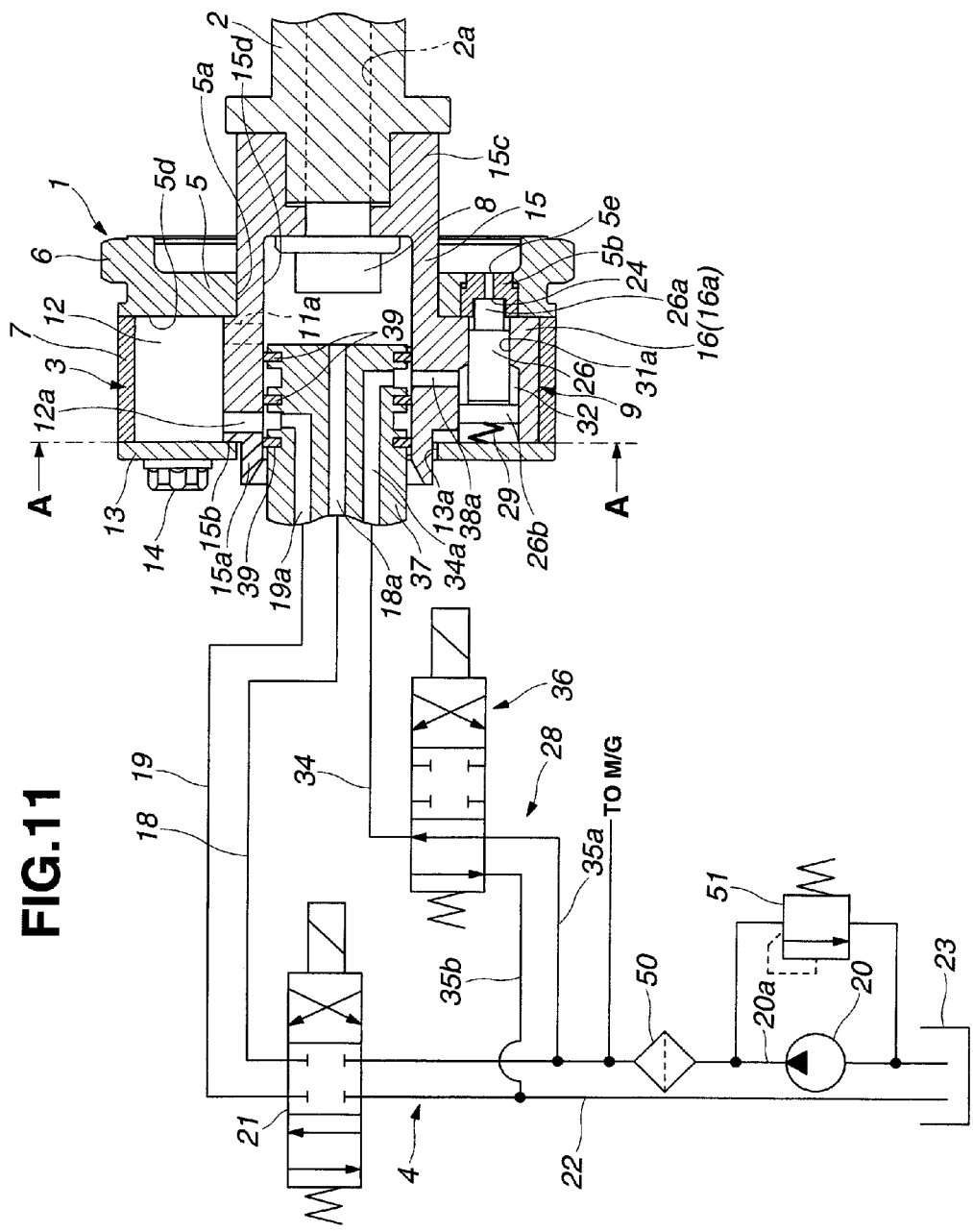

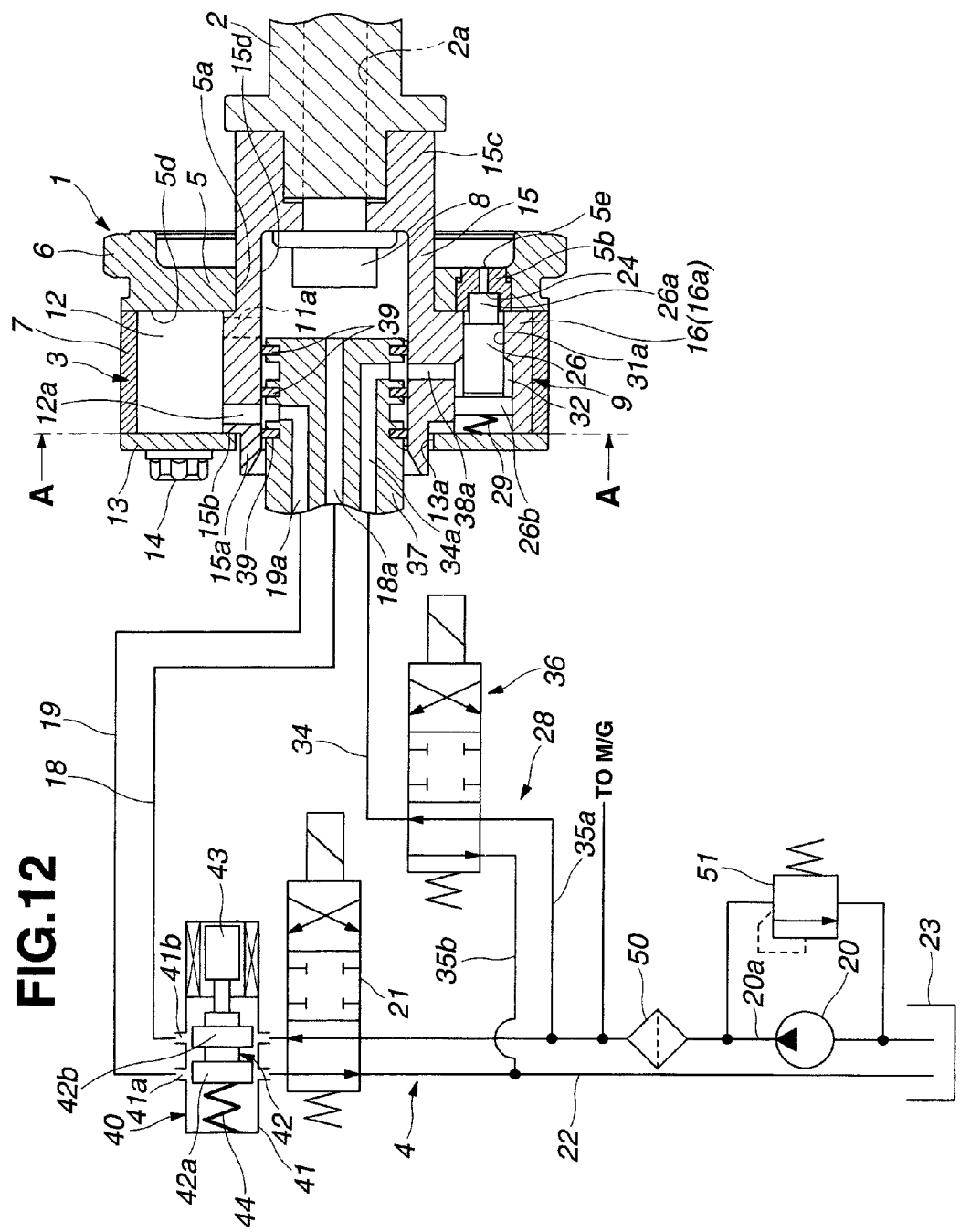

VALVE TIMING CONTROL DEVICE OF INTERNAL COMBUSTION ENGINE

BACKGROUND OF THE INVENTION

1. Field of the Invention

The present invention relates to a valve timing control device of an internal combustion engine, which controls open/close timing of engine valves, such as intake and exhaust valves of the engine, in accordance with an operation condition of an associated motor vehicle.

2. Description of the Related Art

As is known in the art, Atkinson Cycle in internal combustion engines is of a cycle type that improves a thermal efficiency of the engine by increasing compression ratio under operation of the engine. For realization of the Atkinson Cycle, a valve timing control device is usually employed, by which a close timing (viz., IVC) of each intake valve is retarded relative to the bottom dead center (viz., BDC) of the piston thereby to increase a volumetric efficiency of each cylinder. In this case, it is necessary for the valve timing control device to much increase a valve operation angle (viz., an angle for which the intake valve opens) and to control the valve open/close timing to a retarded side.

However, when the engine is stopped, it tends to occur that due to positive/negative alternating torque applied to the camshaft, each intake valve is automatically returned to an angular position for the most-retarded phase. Thus, if, with each intake valve assuming such most-retarded phase position, the engine is subjected to a cold starting or the like, the compression ratio of the engine fails to have a satisfied value because of less inertia of intake air thereby to cause the air in the combustion chamber at the top dead center (viz., TDC) of the piston to fail to reach a satisfied temperature and cause increase of the torque load, which makes the engine starting difficult.

In order to solve the above-mentioned drawback, Japanese Laid-open Patent Application (Tokkai) 2000-250073 proposes, for improved engine startability under cold condition, a valve timing control device which, upon stopping of the engine, causes the close timing of intake valves to take a middle phase between the most-advanced and most-retarded phases. For keeping the close timing to such middle phase, a vane member coaxially fixed to a camshaft is locked at a corresponding angular position.

SUMMARY OF THE INVENTION

However, in the valve timing control device of the above-mentioned publication, due to its inherent construction, the compression ratio at the engine starting is fixed irrespective of the engine temperature. This brings about such an undesired state that even in a condition wherein the engine can start with a smaller compression ratio, the engine has to be started with a higher compression ratio. In such starting, torque load and vibration of the engine can not be reduced to a satisfied level.

It is therefore an object of the present invention to provide a valve timing control device which is thought out by taking the above-mentioned drawback into consideration.

That is, in accordance with the present invention, there is provided a valve timing control device of an internal combustion engine, which can vary the compression ratio of the engine in accordance with an engine environment at the engine starting.

In accordance with a first aspect of the present invention, there is provided a valve timing control device of an internal combustion engine, which comprises a drive rotation member driven by a crankshaft of the engine; a driven rotation member fixed to a camshaft that actuates engine valves to open and close, the drive rotation member and driven rotation member being coaxially arranged to make a relative rotation therebetween; a phase varying mechanism that rotates the driven rotation member relative to the drive rotation member within a given angle, the phase varying mechanism being able to cause the driven rotation member to take the most-retarded phase position, the most-advanced phase position and a middle phase position defined between the most-retarded phase position and the most-advanced phase position; and a position keeping mechanism that is able to keep the driven rotation member at least the most-retarded phase position and the middle phase position at the time of starting the engine, and able to select one of the most-retarded phase position and the middle phase position in accordance with an operation condition of the engine.

In accordance with a second aspect of the present invention, there is provided, in a motor vehicle that is powered by an internal combustion engine and has a function to start the engine by turning an ignition switch ON and a function to automatically start and stop the engine without the aid of the ignition switch, a valve timing control device of the internal combustion engine, which comprises a drive rotation member driven by a crankshaft of the engine; a driven rotation member fixed to a camshaft that actuates engine valves to open and close, the drive rotation member and driven rotation member being coaxially arranged to make a relative rotation therebetween; and a phase varying mechanism that rotates the driven rotation member relative to the drive rotation member within a given angle, wherein the phase varying mechanism changes an angular position taken by the driven rotation member relative to the drive rotation member at the time of starting the engine between a case wherein the engine is stopped by turning the ignition switch off and a case wherein the engine is automatically stopped without the aid of the ignition switch.

In accordance with a third aspect of the present invention, there is provided a valve timing control device of an internal combustion engine, which comprises a drive rotation member driven by a crankshaft of the engine; a driven rotation member fixed to a camshaft that actuates engine valves to open and close, the driven rotation member being arranged to vary a rotation angle relative to the drive rotation member in accordance with an operation condition of the engine; and a control device that varies the rotation angle of the driven rotation member relative to the drive rotation member at the time of starting the engine in accordance with a temperature of the engine.

BRIEF DESCRIPTION OF THE DRAWINGS

Other objects and advantages of the present invention will become apparent from the following description when taken in conjunction with the accompanying drawings, in which:

FIG. 6A is a view similar to FIG. 5A, but showing the lock pin assuming a different position;

FIG. 6B is a view similar to FIG. 5B, but showing the other lock pin assuming a different position;

FIG. 7A is a view similar to FIG. 5A, but showing the lock pin assuming a further different position;

FIG. 7B is a view similar to FIG. 5B, but showing the other lock pin assuming a further different position;

FIG. 8A is a view similar to FIG. 5A, but showing the lock pin assuming a still further different position;

FIG. 8B is a view similar to FIG. 5B, but showing the other lock pin assuming a still further different position;

FIG. 9A is a view similar to FIG. 5A, but showing the lock pin assuming a still further different position;

FIG. 9B is a view similar to FIG. 5B, but showing the other lock pin assuming a still further different position;

FIG. 11 is a view similar to FIG. 1, but showing a condition wherein a first electromagnetic switch valve takes a position to fill phase advancing hydraulic chambers and phase retarding hydraulic chambers with a working fluid;

FIG. 12 is a block diagram showing an entire construction of a second embodiment of a valve timing control device according to the present invention;

DETAILED DESCRIPTION OF THE INVENTION

In the following, five embodiments of a valve timing control device according to the present invention will be described in detail with reference to the accompanying drawings.

Explanation on the embodiments will be directed to examples in which the invention is practically applied to intake valves of an internal combustion engine employed in a hybrid motor vehicle, idle-reduction motor vehicle (or idle-stop motor vehicle) or the like. The idle-reduction motor vehicle is a vehicle that stops operation of the engine when stopping for a while in front of traffic signals.

For ease of understanding, various directional terms such as right, left, upper, lower, rightward and the like are used in the following description. However, such terms are to be understood with respect to only a drawing or drawings on which the corresponding part or portion is shown.

[First Embodiment]

Figure 1:
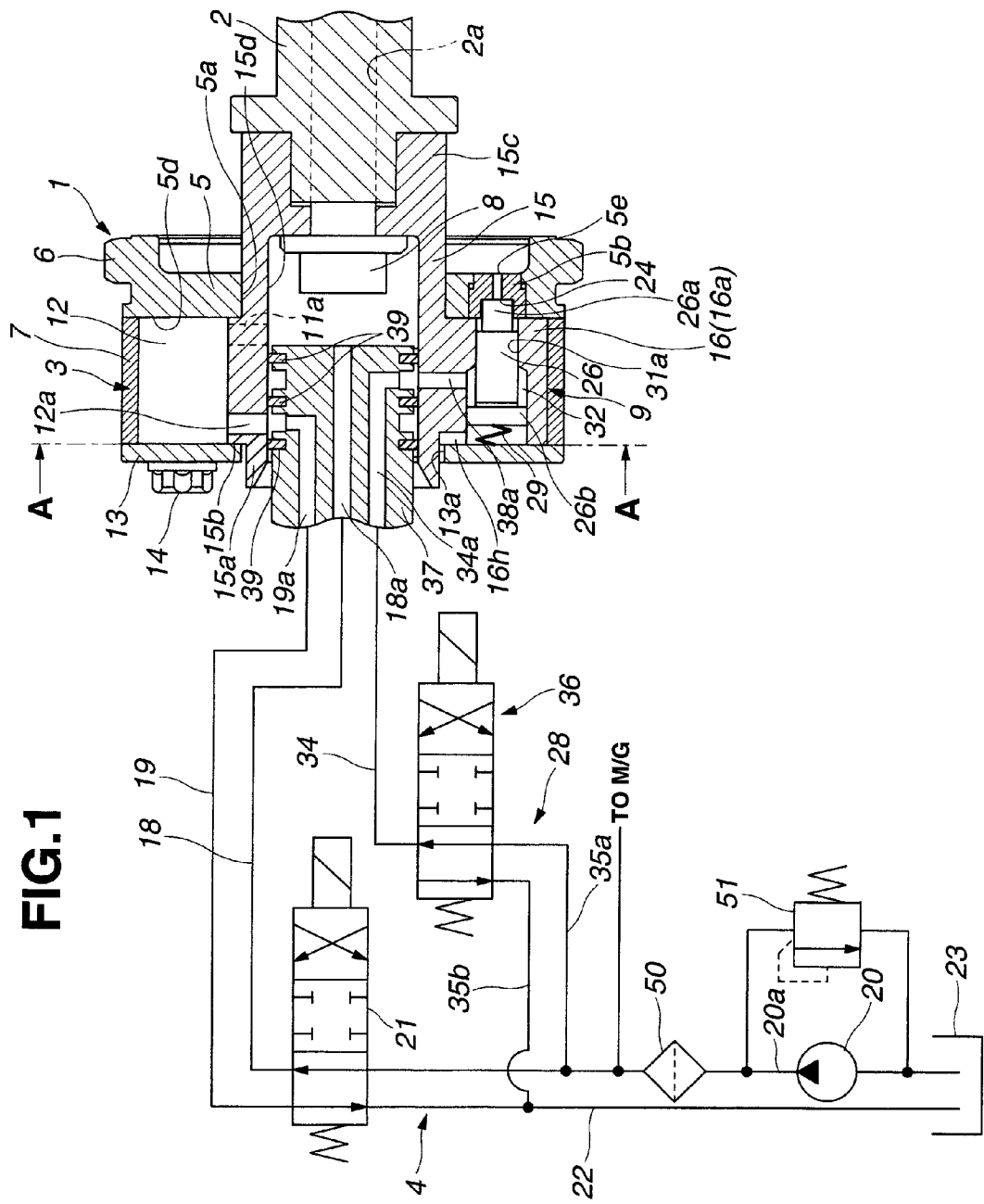
FIG. 1 is a block diagram showing an entire construction of a first embodiment of a valve timing control device according to the present invention.
Figure 2:
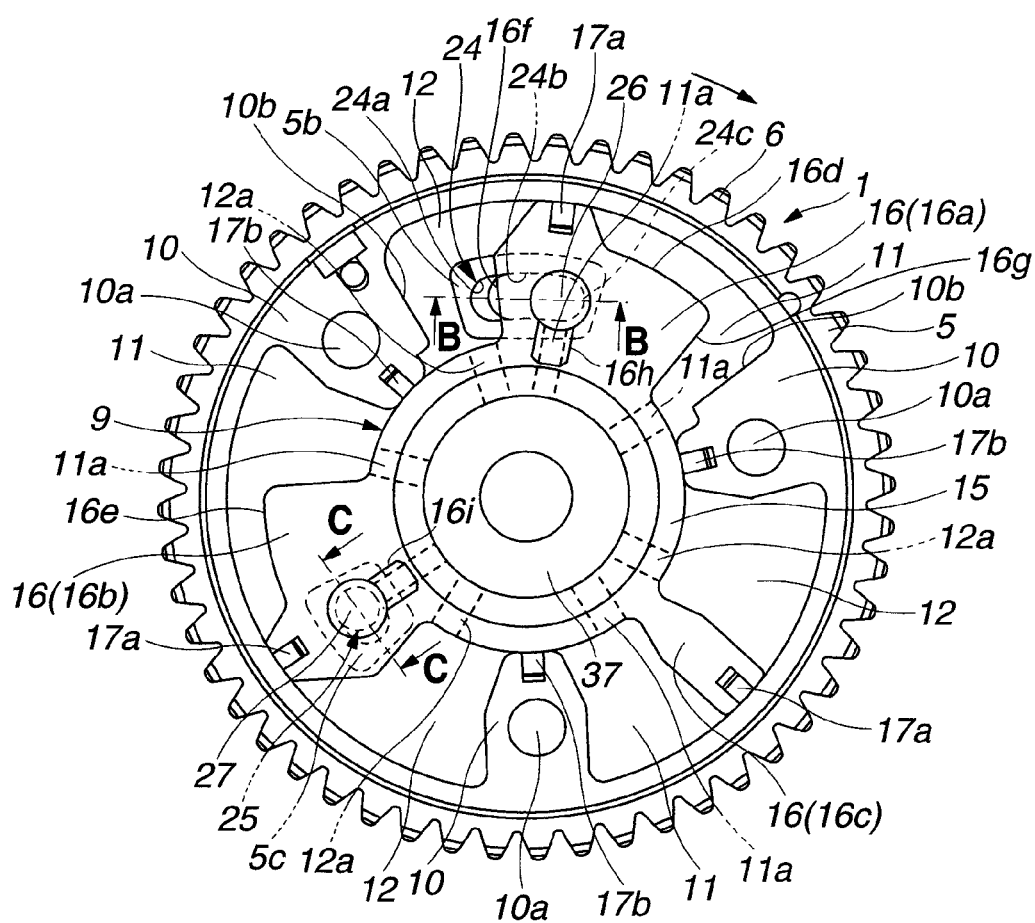
FIG. 2 is a sectional view taken along the line A-A of FIG. 1, showing a vane member taking an angular position for a middle phase.

Referring to FIGS. 1 and 2, there is shown a first embodiment of a valve timing control device of the present invention.

As is seen from FIG. 1, the valve timing control device comprises a rotatable sprocket 1 that is driven by a crankshaft (not shown) of an associated engine through a timing chain (not shown), an intake camshaft 2 that is arranged to extend in an axial direction of the engine and rotatable relative to rotatable sprocket 1, a phase varying mechanism 3 that is arranged between sprocket 1 and intake camshaft 2 to vary a relative angle (or relative phase) defined therebetween, and a first hydraulic circuit 4 that operates phase varying mechanism 3 in a given way.

The sprocket 1 comprises a discal sprocket body 5 and an annular gear portion 6 that is integrally formed around discal sprocket body 5 and meshed with the above-mentioned timing chain. The discal sprocket body 5 constitutes a rear cover for covering a rear opening of an after-mentioned housing (7). As shown, sprocket body 5 has at a center thereof a circular bore 5a through which an after-mentioned vane rotor coaxially fixed to camshaft 2 is rotatably passed. Although not shown in FIG. 1, sprocket body 5 has a through opening at a given position of the peripheral portion thereof.

The camshaft 2 is rotatably held by a cylinder head (not shown) of the engine through bearings (not shown). Although not shown in the drawings, a plurality of cams are integrally formed on given positions of camshaft 2 for operating intake valves (viz., engine valves). As shown in FIG. 1, camshaft 2 has in a left end portion thereof an internal thread 2a formed axially.

As is seen from FIGS. 1 and 2, phase varying mechanism 3 comprises a cylindrical housing 7 that is integrally connected to sprocket 1, a rotatable vane member 9 that is coaxially fixed to the left end (as viewed in FIG. 1) of camshaft 2 through a cam bolt 8 meshed with internal thread 2a and rotatably received in cylindrical housing 7, and three phase retarding hydraulic chambers 11 and three phase advancing hydraulic chambers 12 that are all defined in cylindrical housing 7. That is, as is seen from FIG. 2, these six hydraulic chambers 11 and 12 in total are provided and defined by circumferentially spaced three radially inward projections (or partition walls) 10 of cylindrical housing 7 and circumferentially spaced three radially outward projections (or vanes 16) of vane member 9, which are associated in one-to-one manner.

As is seen from FIG. 1, cylindrical housing 7 comprises a cylindrical body that is made of a sintered metal, an annular front cover 13 that is made of the sintered metal and covers a front (or left) opening of the cylindrical body, and the above-mentioned sprocket body 5 or rear cover that covers the rear (or right) opening of the cylindrical body. The cylindrical body, front cover 13 and sprocket body 5 are tightly united together by three bolts 14 engaged with threaded bolt openings 10a formed in the above-mentioned inward projections 10 of cylindrical housing 7, as will be understood from FIG. 2. The front cover 13 has at a center portion thereof a circular opening 13a.

As is seen from FIGS. 1 and 2, vane member 9 has a single piece construction made of a metal and comprises a vane rotor 15 tightly connected to the left end (in FIG. 1) of camshaft 2 through cam bolt 8, and three vanes 16 that are arranged about vane rotor 15 at equally spaced intervals each being 120 degrees.

As is seen from FIG. 1, vane rotor 15 is a cylindrical member coaxial with camshaft 2, and integrally formed at a center portion of a circular front (or left in FIG. 1) end surface 15b thereof with a smaller annular ridge 15a. A rear (or right) portion 15c of vane rotor 15 extends toward camshaft 2. The smaller annular ridge 15a rotatably supports thereon front cover 13 through an outer surface of annular ridge 15a and front end surface 15b. The vane rotor 15 is formed with an axially extending cylindrical bore 15d which serves as a mating groove.

As has been mentioned hereinabove, each of three vanes 16 of vane member 9 is put between neighboring two of partition walls 10 of cylindrical housing 7.

As is seen from FIG. 2, three vanes 16, viz., a larger vane 16a, a middle vane 16b and a smaller vane 16c have different sizes (or widths) defined with respect to a circumferential direction. As shown, the larger and middle vanes 16a and 16b are each shaped like a sector and have at respective peripheral portions thereof recessed portions 16d and 16e for reducing the weight and achieving balanced weight of vane member 9. While, the smaller vane 16c is shaped like a thicker rectangular plate. Tops of three vanes 16 and tops of three partition walls 10 have respective seal members 17a and 17b for achieving sealing against a cylindrical inner surface of cylindrical housing 7 and a cylindrical outer surface of vane rotor 15 respectively.

Figure 3:
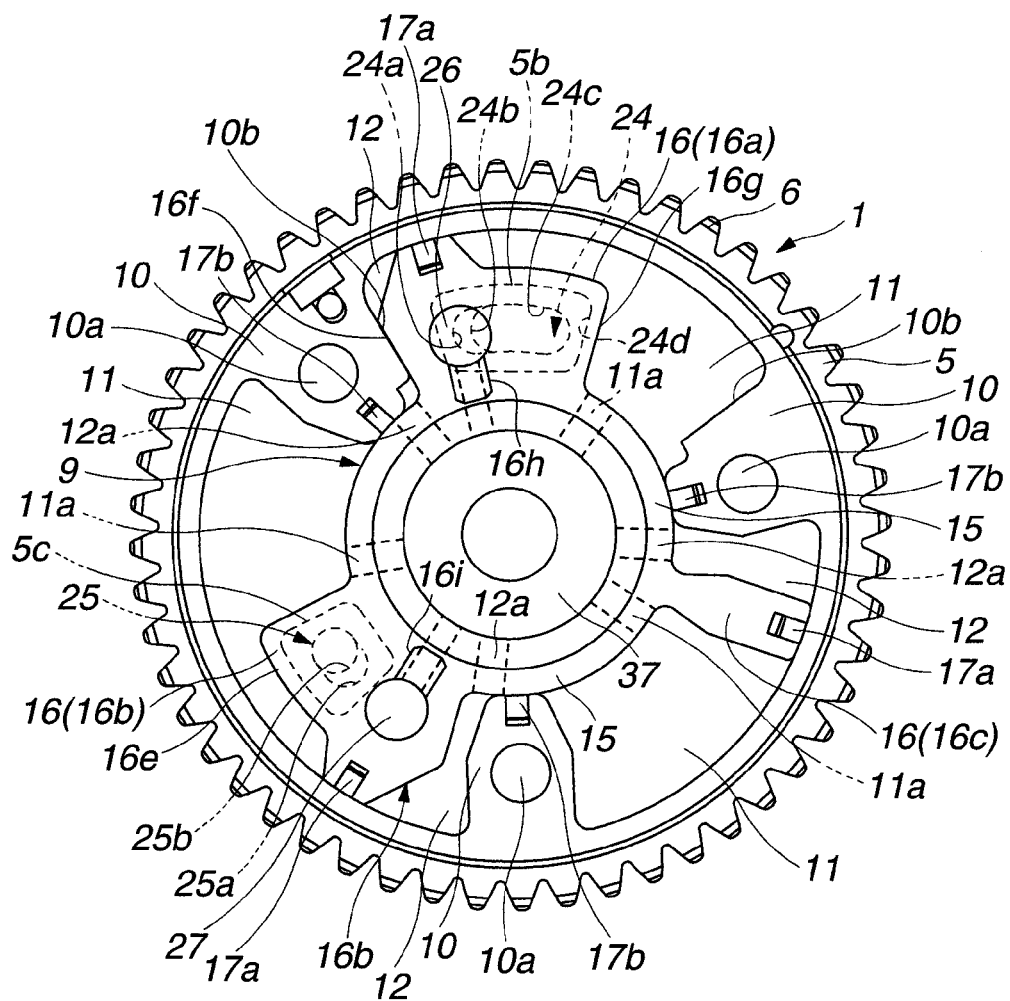
FIG. 3 is a view similar to FIG. 2, but showing the vane member taking an angular position for the most-retarded phase.

As is seen from FIG. 3, when vane member 9 in a neutral angular position (see FIG. 2) is turned in a phase retarding direction (viz., in a counterclockwise direction in FIG. 3), one edge 16f of larger vane 16a is brought into contact with a right edge 10b of the left positioned partition wall 10 thereby restricting the turning of vane member 9 in the phase retarding direction.

Figure 4:
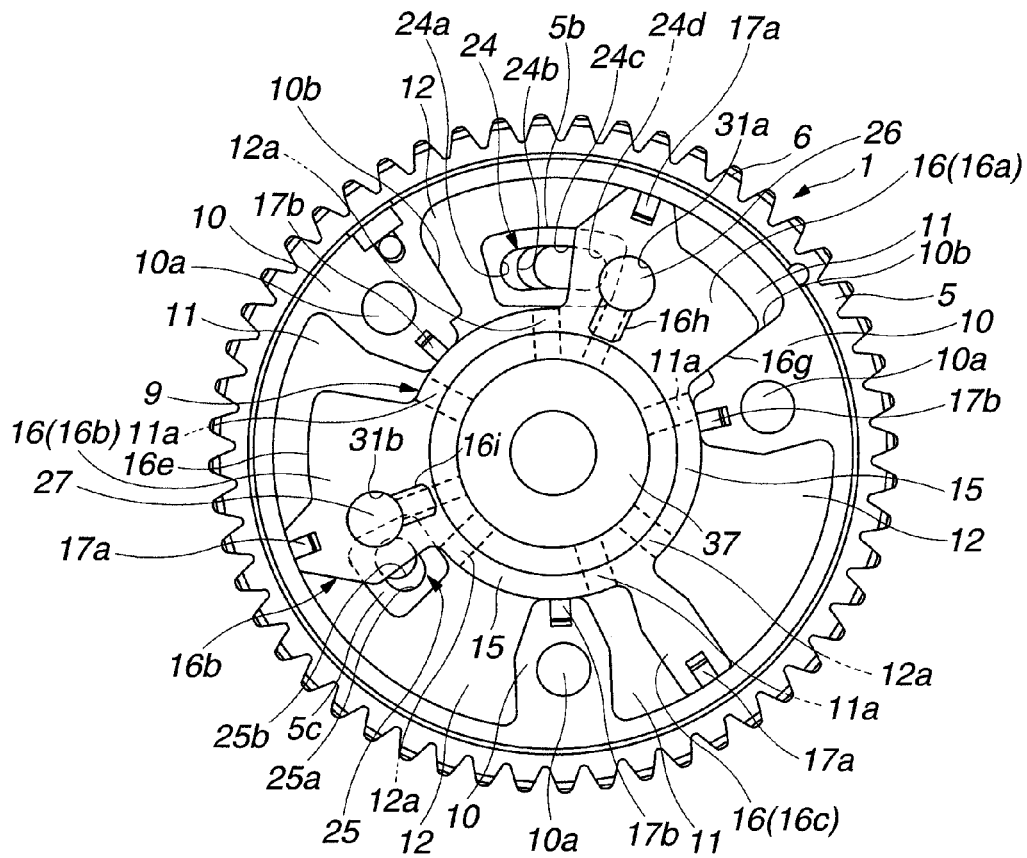
FIG. 4 is a view similar to FIG. 2, but showing the vane member taking an angular position for the most-advanced phase.

While, as is seen from FIG. 4. when vane member 9 in the neutral angular position (see FIG. 2) is turned in a phase advancing direction (viz., in a clockwise direction in FIG. 4), the other edge 16g of the larger vane 16a is brought into contact with a left edge 10b of the right positioned partition wall 10 thereby restricting the turning of vane member 9 in the phase advancing direction.

During the above-mentioned turning of larger vane 16a, the other two vanes 16b and 16c don't contact with their associated partition walls 10, that is, the two vanes 16b and 16c move idly in their associated spaces. With these movement, the precision with which vane 16a of vane member 9 contacts to partition walls 10 is improved, and the speed at which the working fluid is fed to the phase retarding and advancing hydraulic chambers 11 and 12 is increased, which increases a responsivity of vane member 9 with respect to the normal/reverse rotation. This will become more apparent as the description proceeds.

As is seen from FIG. 2, between one edge 16g of each vane 16a, 16b or 16c and one edge 10b of a neighboring partition wall 10 that faces the edge 16g, there is defined one phase retarding hydraulic chamber 11, and between the other edge 16f of each vane 16a, 16b or 16c and one edge 10b of another neighboring partition wall 10 that faces the edge 16f, there is defined one phase advancing hydraulic chamber 12. Because of provision of the three vanes 16a, 16b and 16c and provision of the three partition walls 10, there are defined six hydraulic chambers in total, which are three phase retarding hydraulic chambers 11 and three phase advancing hydraulic chambers 12.

As is seen from FIGS. 1 and 2, the three phase retarding hydraulic chambers 11 are connected to first hydraulic circuit 4 through radially extending bores 11a formed in vane rotor 15, while the three phase advancing hydraulic chambers 12 are connected to first hydraulic circuit 4 through radially extending bores 12a formed in vane rotor 15.

The first hydraulic circuit 4 functions to selectively charge and discharge the two types of hydraulic chambers 11 and 12 with a working fluid (or hydraulic pressure).

As is seen from FIG. 1, first hydraulic circuit 4 comprises a retarding fluid passage 18 that is connected to three phase retarding hydraulic chambers 11 through the three radially extending bores (or first connection passage means) 11a, an advancing fluid passage 19 that is connected to three phase advancing hydraulic chambers 12 through the three radially extending bores (or second connection passage means) 12a, an oil pump 20 that feeds the retarding and advancing fluid passages 18 and 19 with the working fluid and a first electromagnetic switch valve 21 that switches the direction of fluid flow in fluid passages 18 and 19. The oil pump 20 may be a known one, such as a trochoid pump driven by the crankshaft of the engine.

As shown in FIG. 1, retarding and advancing fluid passages 18 and 19 have ends that are respectively connected to openings of first electromagnetic switch valve 21, and fluid passages 18 and 19 have other ends that are respectively connected to phase retarding and advancing hydraulic chambers 11 and 12 through axially extending passages 18a and 19a formed in a passage defining cylindrical body 37 that is hermetically received in vane rotor 15 and smaller annular ridge 15a of vane member 9 and through the above-mentioned first and second connection passage means 11a and 12a.

Although not shown in the drawings, the passage defining cylindrical body 37 has a left end (in FIG. 1) fixed to a chain cover that covers the timing chain. Thus, passage defining body 37 is a fixed member. As will be described hereinafter, the passage defining cylindrical body 37 has further a passage 34a leading to a second hydraulic circuit 28 that functions to cancel a locked condition of an after-mentioned lock mechanism.

As is seen from FIG. 1, first electromagnetic switch valve 21 is of a proportional type having four ports and three positions. With the aid of an electronic controller (not shown), a spool member is axially shifted to a desired position in a valve body to connect a discharge passage 20a of oil pump 20 to one of the retarding and advancing fluid passages 18 and 19 and connect the other of the fluid passages 18 and 19 to a drain passage 22. While, when an associated engine stops, the spool member is shifted to and held in a middle position shutting the all connection between fluid passages 18 and 19, discharge passage 20a and drain passage 22, thereby holding a certain amount of the working fluid in the retarding and advancing hydraulic chambers 11 and 12.

An intake passage of oil pump 20 and drain passage 22 are connected to an oil pan 23. The discharge passage 20a of oil pump 20 is provided with an oil filter 50. To discharge passage 20a at a position downstream oil filter 50, there is connected a main oil gallery (M/G) that feeds various frictional portions of the engine with the oil (viz., working fluid as a lubricating oil). A flow control valve 51 is further provided which provides discharge passage 20a with a desired flow rate of the working fluid by returning an excessive amount of the working fluid from discharge passage 20a to oil pan 23

The above-mentioned electronic controller comprises a computer and processes various information signals from various sensors to detect the current operation condition of the engine and controls first electromagnetic switch valve 21 and the after-mentioned second electromagnetic switch valve 36 in accordance with the detected current operation condition of the engine. The sensors are for example a crank angle sensor for detecting an engine speed, an air flow meter, an engine cooling water temperature sensor, an engine temperature sensor, a throttle valve open degree sensor, a cam angle sensor for detecting a current phase angle shown by camshaft 2, etc.,. For controlling first and second electromagnetic switch valves 21 and 36, control pulses are fed from the electronic controller to respective coils of electromagnetic switch valves 21 and 36 to shift respective spool members to desired positions for controlling or changing the flow direction of the oil.

In the first embodiment of the present invention, there is provided a so-called "position keeping mechanism" that is able to hold or keep, relative to cylindrical housing 7, vane member 9 at a middle phase position (viz., the position shown in FIG. 2) between the most-retarded phase position as shown in FIG. 3 and the most-advanced phase position as shown in FIG. 4.

Figures 5A, 5B:
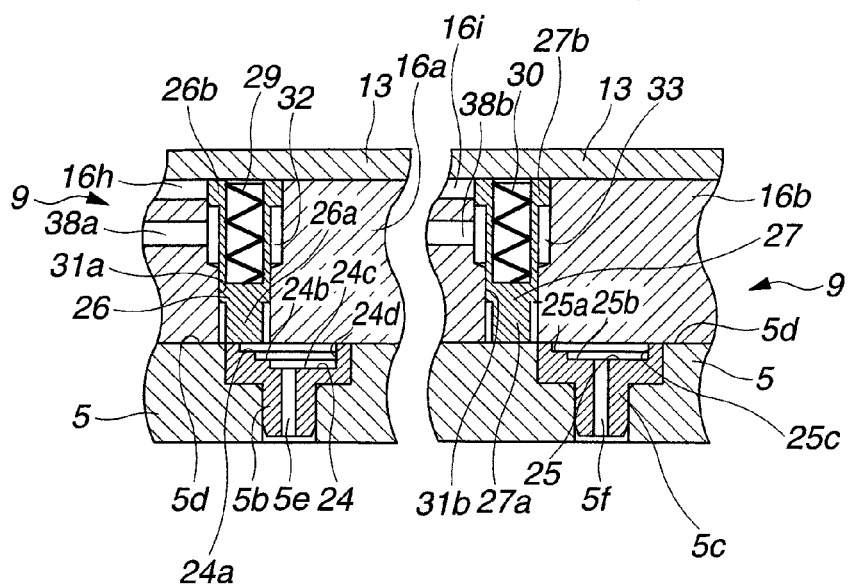
FIG. 5A is a sectional view taken along the line B-B of FIG. 2, showing a lock pin assuming one position.
FIG. 5B is a sectional view taken along the line C-C of FIG. 2, showing the other lock pin assuming one position.

As will be understood from FIGS. 2, 5A and 5B, the position keeping mechanism comprises first and second lock openings 24 and 25 possessed by two apertured members 5b and 5c that are provided in discal sprocket body 5 at predetermined positions in a circumferential direction, first and second lock pins 26 and 27 that are axially movable in first and second pin bores 31a and 31b respectively formed in two vanes 16a and 16b and engageable with the above-mentioned first and second lock openings 24 and 25, and the above-mentioned second hydraulic circuit 28 (see FIG. 1) that functions to cancel the engagement between lock pins 26 and 27 and first and second lock openings 24 and 25.

As is seen from FIGS. 2 and 5A, first lock opening 24 is arcuate in shape extending in a circumferential direction of sprocket body 5. As is seen from FIG. 3, arcuate opening 24 is placed at a center position that is somewhat advanced in phase as compared with the most-retarded phase position taken by vane member 9.

As is understood from FIG. 5A, first lock opening 24 has a three-stepped shape in cross section. The three steps become deeper as they take more advanced position. The three steps constitute a guide mechanism as will become apparent hereinafter.

More specifically, the three-stepped opening 24 has first, second and third steps 24a, 24b and 24c which are gradually lowered taking a inside surface 5d of discal sprocket body 5 as the highest base floor. An inside end surface 24d located at a phase advanced position constitutes a curved wall rising vertically, as shown. Accordingly, when first lock pin 26 having engaged with first lock opening 24 is forced to move down stepwise from first step 24a to second step 24b and then to third step 24c while shifting in the phase advancing direction, first lock pin 26 is prevented from moving backward, that is, in the retarding direction by three gaps possessed by three steps 24a, 24b and 24c. That is, the first, second and third steps 24a, 24b and 24c (or gaps) serve as a so-called one way clutch (or ratchet).

As is seen from FIG. 5A, when a leading end 26a of first lock pin 26 is brought into contact with the inside end surface 24d of first lock opening 24, movement of first lock pin 26 (and thus movement of vane member 9) in the phase advancing direction is stopped.

As is seen from FIG. 5A, an opening provided by apertured member 5b is denoted by numeral 5e, which serves as an air vent. The larger vane 16a of vane member 9 has a first pin bore 31a which has at an upper portion thereof an air vent groove 16h. Due to provision of such air vent opening 5e and air vent groove 16h, smoothed movement of first lock pin 26 is achieved.

As is seen from FIG. 5B, an opening provided by apertured member 5c is denoted by numeral 5f, which serves as an air vent, and middle vane 16b of vane member 9 has a second pin bore 31b which has an upper portion thereof an air vent groove 16i. Due to provision of such air vent opening 5f and air vent groove 16i, smoothed movement of second lock pin 27 is achieved.

As is seen from FIGS. 2 and 5B, second lock opening 25 is also arcuate in shape extending in a circumferential direction of sprocket body 5. As is seen from FIG. 3, arcuate opening 25 placed at a center position that is somewhat advanced in phase as compared with the most-retarded phase position taken by vane member 9.

As is seen from FIG. 5B, second lock opening 25 has a two-stepped shape in cross section. The two steps become deeper as they take more advanced position. The two steps constitute a guide mechanism as will become apparent hereinafter.

More specifically, the two-stepped opening 25 has first and second steps 25a and 25b which are gradually lowered taking inside surface 5d of discal sprocket body 5 as the highest base floor. An inside end surface 25c placed at a phase advanced position constitutes a curved wall rising vertically, as shown.

It is to be noted that the gaps respectively provided by first and second steps 25a and 25b are substantially the same in shape as the gaps respectively provided by first and second steps 24a and 24b of the above-mentioned first lock opening 24. Accordingly, when second lock pin 27 having engaged with second lock opening 25 is forced to move down stepwisely from first step 25a to second step 25b while shifting in the phase advancing direction, the second lock pin 27 is prevented from moving backward, that is, in the retarding direction by the gaps possessed by the two steps 25a and 25b. That is, first and second steps 25a and 25b (or gaps) serve as a so-called one way clutch (or ratchet).

Positional relation between first and second lock openings 24 and 25 will become understood from the following description with the aid of the drawings from FIG. 5A to FIG. 10B.

During a time for which first lock pin 26 is kept engaged with first, second and third steps 24a, 24b and 24c of first lock opening 24, second lock pin 27 is not engaged with second lock opening 25, that is, as is shown in FIGS. 5B, 6B, 7B and 8B, leading end 27a of second lock pin 27 is kept in contact with inside surface 5d of sprocket body 5.

Figures 10A, 10B:
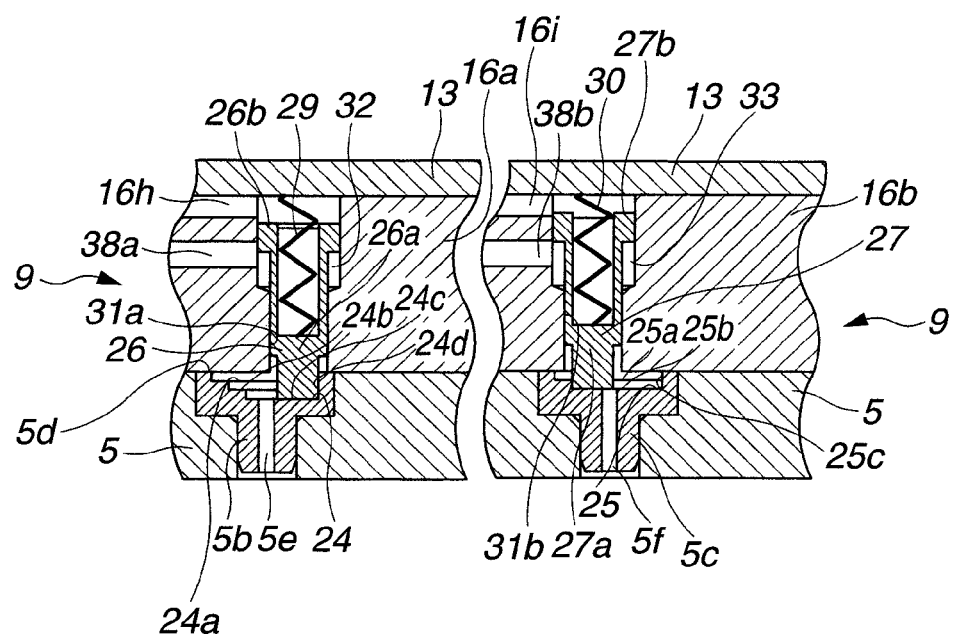
FIG. 10A is a view similar to FIG. 5A, but showing the lock pin assuming a still further different position.
FIG. 10B is a view similar to FIG. 5B, but showing the other lock pin assuming a still further different position.

While, when, thereafter, as is seen from FIG. 9A, when first lock pin 26 having contacted with third step 34c starts to slide on third step 24c in the phase advancing direction, leading end 27a of second lock pin 27 is put into first step 25a of second lock opening 25 as is shown in FIG. 9B. When thereafter, first lock pin 26 further slides on third step 24c in the phase advancing direction and finally contacts inside end surface 24d of first lock opening 24 as shown in FIG. 10A, leading end 27a of second lock pin 27 is put into second step 25b as is shown in FIG. 10B.

In short, during the time for which vane member 9 is kept turned from a certain retarded position to a certain advanced position, first lock pin 26 is forced to engage with first, second and third steps 24a, 24b and 24c of first lock opening 24 in order, and thereafter second lock pin 27 is allowed to engage with first and second steps 25a and 25b of second lock opening 25 in order. With such movement of lock pins 26 and 27, vane member 9 is turned stepwisely in the phase advancing direction while being prevented from turning backward (viz., in the phase retarding direction) by the five step ratchet function, and finally, vane member 9 is brought to and held at the middle phase position (viz., the position shown in FIG. 2) between the most-retarded phase position as shown in FIG. 3 and the most-advanced phase position as shown in FIG. 4.

As is seen from FIGS. 1 and 5A, first lock pin 26 is slidably received in first pin bore 31a formed in larger vane 16a and comprises a first larger diameter portion 26b integrally formed on a rear part thereof to serve as a pressure receiving part and a smaller diameter portion (or leading end) 26a coaxially connected to larger diameter portion 26b, which is sized to be intimately engageable with first, second and third steps 24a, 24b and 24c of first lock opening 24. The leading end 26a has a circular flat face. The first lock pin 26 is biased in a direction to engage with first lock opening 24 by a first spring 29 that is compressed between first lock pin 26 and annular front cover 13. For easy understanding of the biasing method, illustration of the arrangement of first spring 29 somewhat modified in FIG. 1.

As is seen from FIG. 5B, second lock pin 27 is slidably received in second pin bore 31b formed in middle vane 16b and comprises a second larger diameter portion 27b integrally formed on a rear part thereof to serve as a pressure receiving part and a smaller diameter portion (or leading end) 27a coaxially connected to the larger diameter portion 27b, which is sized to be intimately engageable with first and second steps 25a and 25b of second lock opening 25. The leading end 27a has a circular flat face. Like first lock pin 26, second lock pin 27 is also biased in a direction to engage with second lock opening 25 by a second spring 30 that is compressed between second lock pin 27 and annular front cover 13.

As is seen from FIGS. 1, 5A and 5B, second hydraulic circuit 28 comprises a first lock cancelling pressure chamber 32 that is defined between a recessed portion of first pin bore 31a and first larger diameter portion 26b of first lock pin 26, a second lock cancelling pressure chamber 33 that is defined between a recessed portion of second pin bore 31b and second larger diameter portion 27b of second lock pin 27, a charge/discharge passage 34 that functions to selectively feed the two lock cancelling pressure chambers 32 and 33 with a given hydraulic pressure from discharge passage 20a of oil pump 20 through a hydraulic pressure charging passage 35a and drain the hydraulic pressure in the two pressure chambers 32 and 32 into oil pan 23 through charge/discharge passage 34 and a hydraulic pressure discharging passage 35b, and a second electromagnetic switch valve 36 that selectively connects charge/discharge passage 34 to either one of pressure charging and discharging passages 35a and 35b.

Upon receiving a given hydraulic pressure, the two pressure chambers 32 and 33 function to shift respective lock pins 26 and 27 against springs 29 and 30 in a direction to cancel the engagement of lock pins 26 and 27 with corresponding lock openings 24 and 25.

As is seen from FIGS. 1, 5A and 5B, charge/discharge passage 34 has one end connected to one side of second electromagnetic switch valve 36. The other end of passage 34 constitutes a charge/discharge passage part 34a formed in passage defining cylindrical body 37.

As is seen from the drawings, passage part 34a extends axially in cylindrical body 37 and bends in a radially outward to connect with first and second lock cancelling pressure chambers 32 and 33 through first and second fluid passages 38a and 38b separately formed in vane rotor 15.

As is seen from FIG. 7, cylindrical body 37 has therearound a plurality of grooves that receive seal members 39 of which outer peripheries hermetically contact to the inner cylindrical wall of vane rotor 15. With such seal members 39, the three passages 18a, 19a and 34a are hermetically isolated from one another.

As is seen from FIG. 1, the second electromagnetic switch valve 36 is of a proportional type having four ports and three positions. With the aid of the electronic controller (not shown), a spool member is axially shifted in a valve body to a desired position to connect charge/discharge passage 34 to either one of charging and discharging passages 35a and 35b or disconnect charge/discharge passage 34 from both passages 35a and 35b. Upon this disconnection, a certain amount of the working fluid is held or locked in first and second lock cancelling pressure chambers 32 and 33.

In the following, operation of the valve timing control device of the first embodiment will be described with the aid of the drawings.

[Controlled Operation Just After Short Stop of Engine]

When, after running of an associated motor vehicle, an ignition switch of the vehicle is turned off to stop the engine, oil pump 20 is stopped. Upon this, feeding of the working fluid to the three phase retarding hydraulic chambers 11 or the three phase advancing hydraulic chambers 12 is stopped. If, in this case, the timing of cam torque (viz., alternating torque) produced upon stop of the engine is negative, vane member 9 is forced to turn in the phase advancing direction because vane member 9 has been kept permitted to turn in both directions. However, if such phase advancing turning takes place, it is impossible to keep vane member 9 in the most-retarded phase position.

Accordingly, in the invention, upon stop of the engine, the control is so made as to cause the cam torque timing to be positive.

For that control, with the aid of the electronic controller, first electromagnetic switch valve 21 is energized to move and keep its spool member to and at a neutral position. Upon this, as will be seen from FIG. 11, the connection between the passages 18 and 20a and that between the passages 19 and 22 are blocked.

That is, when oil pump 20 is stopped, there is a possibility that the working fluid in discharge passage 20a is returned to oil pan 23 through oil pump 20 due to a difference in fluid head and the working fluid in phase retarding hydraulic chambers 11 and phase advancing hydraulic chambers 12 is also returned to oil pan 23. If the working fluid is discharged from chambers 11 and 12, vane member 9 in the most-retarded phase position is forced to flap at the time of starting the engine due to the alternating torque. The flap of vane member 9 tends to produce uncomfortable noise due to contact with partition walls 10.

In the first embodiment of the invention, by suitably controlling operation of first electromagnetic switch valve 21 at the time of stopping the engine, both fluid passages 18 and 19 are closed to hold a certain amount of working fluid in both chambers 11 and 12. With this, undesired flap of vane member 9 is suppressed or at least minimized.

When thereafter the engine is restarted in a short time (for example 15 minutes that keep the engine still warm) from the previous engine stop, vane member 9 is kept at the most-retarded phase position as shown in FIG. 3 and thus the close timing of each intake valve takes the most-retarded phase position with respect to the piston bottom dead center thereby lowering the effective compression ratio of the engine. With this lowering in the effective compression ratio, pumping loss is reduced and undesired vibration of the engine is minimized, which brings about improved engine startability.

The valve timing control effected after the above-mentioned restarting of the engine does not depend on ON/OFF turning of the ignition switch except the time when the driver wants to stop the engine. That is, under idling stop condition of the engine that is automatically produced during cruising of the vehicle, the above-mentioned operation is carried out since the period from the time when the engine is stopped and the time when the engine is restarted is short. That is, since, in such case, vane member 9 is kept at the most-retarded phase position, the effective compression ratio of the engine at the time of restarting is lowered and thus startability of the engine is improved.

[Controlled Operation After Long Stop of Engine]

While, when the engine is restarted after a long time (for example, longer than 15 minutes that fail to keep the engine warm) has passed from the previous engine stop, the electronic controller controls first electromagnetic switch valve 21 to shift the spool member to a position to connect the discharge passage 20a to one of retarding and advancing fluid passages 18 and 19 and connect drain passage 22 to the other one of fluid passages 18 and 19.

At the same time, the electronic controller controls second electromagnetic switch valve 36 to shift the spool member to a position to connect charge/discharge passage 34 to pressure discharging passage 35b. With this, the working fluid in first and second lock cancelling pressure chambers 32 is discharged causing first and second lock pins 26 and 27 to be biased toward the engaged position by springs 29 and 30.

In an initial stage of cranking for restarting the engine, the discharge pressure from oil pump 20 is still low, and thus, the group of phase retarding hydraulic chambers 11 or the group of phase advancing hydraulic chambers 12 fails to have a satisfied hydraulic pressure.

Accordingly, as will be understood when referring to FIGS. 5A and 6A, vane member 9 is slightly turned in the phase advancing direction by the negative part of the alternating torque applied to camshaft 2 of the engine, and thus leading end 26a of first lock pin 26 is aligned with and brought into engagement with the first step 24a of first lock opening (three-stepped opening) 24. Upon this, vane member 9 is applied with a positive torque and thus biased in the phase retarding direction. However, as is seen from FIG. 6A, due to abutment of leading end 26a against the raised wall of first step 24a, turning of vane member 9 in the phase retarding direction is assuredly suppressed (viz., ratchet function).

Thereafter, in response to the negative torque applied to camshaft 2, vane member 9 is turned in the phase advancing direction and, as will be understood from FIGS. 7A, 8A and 9A, first lock pin 26 is brought into engagement with second and third steps 24b and 24c of first lock opening 24 one after another while being applied with a ratchet function and finally, as is seen from FIG. 9A, first lock pin 26 shifts on third step 24c in the phase advancing direction.

During the above operation, as is seen from FIGS. 9B and 10B, leading end 27a of second lock pin 27 is brought into engagement with first and second steps 25a and 25b of second lock opening 25 one after another while being applied with a ratchet function, and finally, as is seen from FIG. 10B, second lock pin 27 is held in second step 25b of second lock opening 25.

With the above-mentioned operation, vane member 9 is brought to and held in the middle phase position as shown in FIG. 2 controlling the close timing of each intake valve to an advanced phase position relative to the bottom dead center (BDC) of the piston. With this, the compression ratio of the engine is increased improving the combustion quality, which brings about a satisfied startability of the engine at the time when the engine temperature is low.

When, with the engine being sufficiently warmed by the initial operation, the engine is brought to a normal operation condition and brought to a high speed operation, first electromagnetic switch valve 21 takes a position to connect discharge passage 20a with advancing fluid passage 19 and connect retarding fluid passage 18 with drain passage 22.

With this, phase retarding hydraulic chambers 11 become lower in pressure and phase advancing hydraulic chambers 12 become higher in pressure, and thus, as is seen from FIG. 4, vane member 9 is turned to the most-advanced phase position. With this, the open timing of the intake valves is advanced increasing the valve overlap between intake and exhaust valves, and thus, the amount of intake air is increased increasing the output of the engine.

Under this condition, as is described hereinabove, second electromagnetic switch valve 36 keeps the position to connect the charge/discharge passage 34 with pressure charging passage 35a and closes discharging passage 35b. Thus, vane member 9 is permitted to make a free turning.

As is described hereinabove, in the first embodiment, in accordance with the time for which the engine is kept off, that is, in accordance with the temperature of the engine, the compression ratio of the engine at the time of restarting the engine is varied. Thus, due to reduction in torque load at the engine starting, the startability of the engine is improved. Furthermore, vibration of the engine and emission from the engine are both reduced.

Because of provision of the position keeping mechanism having the above-mentioned construction, vane member 9 can keep its middle phase position. Furthermore, due to provision of the stepwisely guiding mechanism (viz., the guide mechanism) including the stepped lock openings 24 and 25, lock pins 26 and 27 are permitted to move (or to be guided) only in a direction to achieve a locking with lock openings 24 and 25, and thus, the guiding for lock pins 26 and 27 is assuredly and stably made.

In the above-mentioned first embodiment, the period from the time when the engine is stopped to the time when the engine is restarted forms a parameter for the control of the valve timing. However, if desired, the temperature of the engine may be a parameter for the valve timing control. That is, in such case, it is possible to control the valve timing depending on whether the engine temperature is higher than a given level or not. This is more practical.

In the first embodiment, the position keeping mechanism has one mechanical group that includes first lock pin 26 and first, second and third steps 24a, 24b and 24c and the other mechanical group that includes second lock pin 27 and first and second steps 25a and 25b. Thus, the thickness of discal sprocket body 5 that has lock openings 24 and 25 formed therein can be reduced. That is, if only lock pin is employed in place of the two lock pins 26 and 27, the five steps 24a, 24b, 24c, 25a and 25b should be made aligned. Of course, in this case, a thicker construction of the sprocket body is needed for the five steps 24a, 24b, 24c, 25a and 25b which are aligned. Because of the thinner construction of sprocket body 5 employed in the first embodiment, the axial length of the valve timing control device can be reduced, which improves freedom in layout.

[Second Embodiment]

Referring to FIG. 12, there is shown a second embodiment of a valve timing control device of the present invention.

In this second embodiment, a third electromagnetic switch valve 40 is further employed. That is, as shown in the drawing, third electromagnetic switch valve 40 is arranged between first electromagnetic switch valve 21 and each of retarding and advancing fluid passages 18 and 19.

The third electromagnetic switch valve 40 is of an ON/OFF type having two positions.

As shown, third electromagnetic switch valve 40 comprises a valve body 41 having two passages 41b and 41a that are connected to retarding and advancing fluid passages 18 and 19 respectively.

Within valve body 41, there is axially movably disposed a spool member 42 that has two lands 42a and 42b to open and close passages 41a and 41b respectively. For actuating spool member 42 with the aid of the electronic controller (not shown), there is provided an electric solenoid 43. That is, upon receiving ON signal from the electronic controller, electric solenoid 43 shifts spool member 42 to a position to close passages 41*a* and 41*b* respectively. A biasing spring 44 is further employed that biases spool member 42 in a direction to open passages 41*a* and 41*b*.

When, after stopping the engine, vane member 9 comes to a position in the way to the most-retarded phase position, the electronic controller issues ON-signal to electric solenoid 43 to close passages 41*a* and 41*b*.

With this closing action to passages 41*a* and 41*b*, the working fluid in phase retarding hydraulic chambers 11 or phase advancing hydraulic chambers 12 is assuredly held or locked in chambers 11 or 12, and thus, vane member 9 can be stably and assuredly held in the position in the way to the most-retarded phase position.

That is, in the second embodiment, employment of the third electromagnetic switch valve 40 compensates a possible weakness inevitably possessed by first electromagnetic switch valve 21. That is, in general, the proportional type electromagnetic switch valve 21 is constructed to focus on a smoothed action of the spool member sacrificing a hermeticity thereof.

When third electromagnetic switch valve 40 becomes deenergized upon receiving OFF-signal from the electronic controller, spool member 42 is moved to the open position by the force of biasing spring 44. Upon this, discharge passage 20*a* becomes in communication with either one of retarding and advancing fluid passages 18 and 19 by first electromagnetic switch valve 21.

[Third Embodiment]

Figure 13:
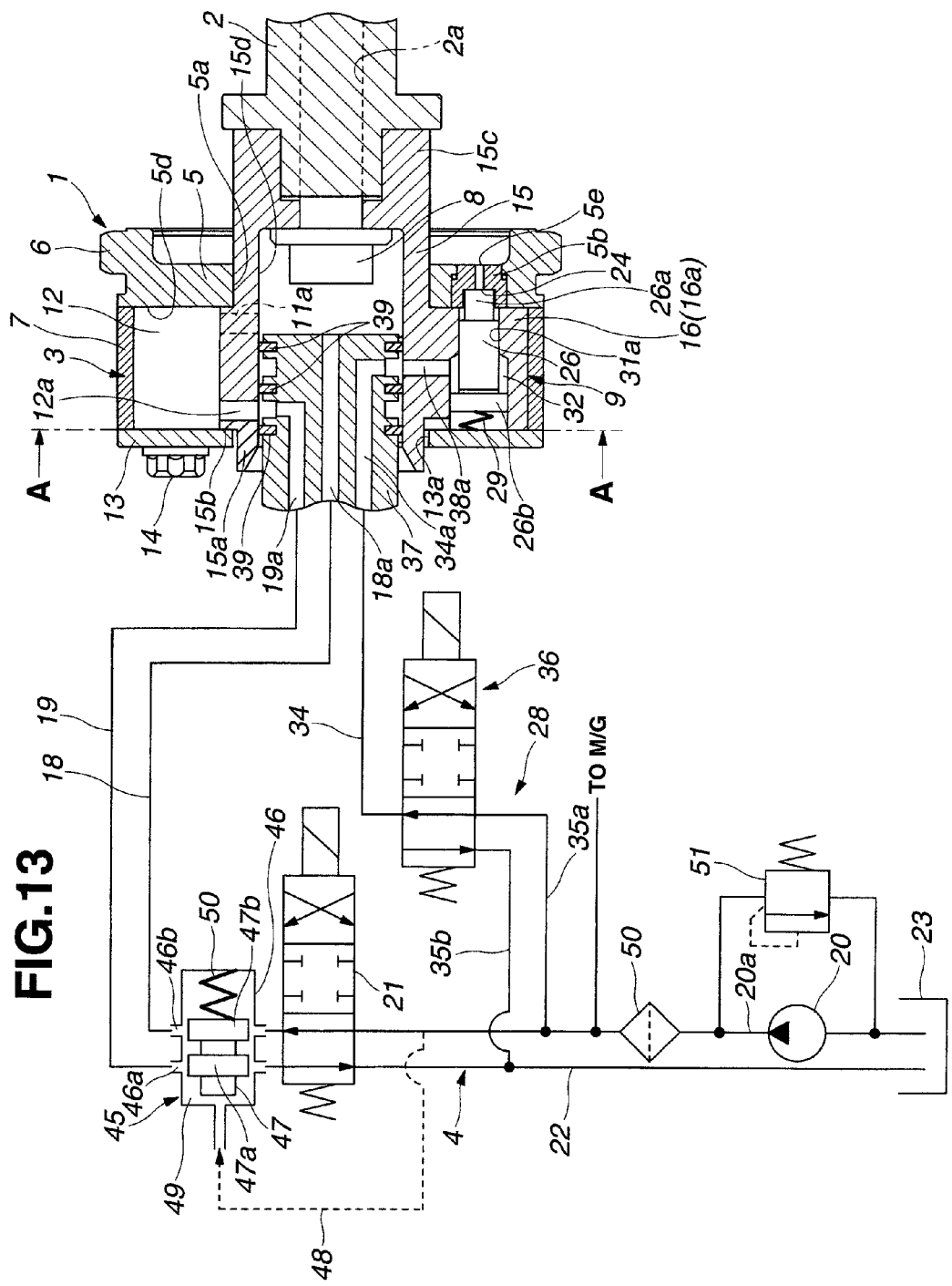
FIG. 13 is a view similar to FIG. 12, but showing a third embodiment of the present invention.

Referring to FIG. 13, there is shown a third embodiment of a valve timing control device of the present invention.

In this third embodiment, in place of third electromagnetic switch valve 40 employed in the second embodiment, a mechanical switch valve 45 is used that practically uses a pilot pressure.

That is, the switch valve 45 is of ON/OFF type having two positions.

As shown, the switch valve 45 comprises a valve body 46 having two passages 46*b* and 46*a* that are connected to retarding and advancing fluid passages 18 and 19 respectively.

Within valve body 46, there is axially movably disposed a spool member 47 that has two lands 47*a* and 47*b* to open and close passages 46*a* and 46*b* respectively.

As shown, a left end of spool member 47 is exposed to a pressure chamber 49 that is connected to discharge passage 20*a* through a pilot passage 48, and a biasing spring 50 is connected to a right end of spool member 47 to bias spool member 47 leftward in the drawing. When a certain pressure is led to pressure chamber 49 from discharge passage 20*a*, spool member 47 is shifted to a position to open passages 46*a* and 46*b*.

When the engine is stopped and thus oil pump 20 is also stopped, the pressure from oil pump 20 is reduced. Upon this, spool member 47 is shifted leftward in the drawing to close passages 46*a* and 46*b* by the force of biasing spring 50.

While, when the engine is started, the discharge pressure from oil pump 20 increases. When the discharge pressure increases to a given level, the hydraulic pressure in pressure chamber 49 moves spool member 47 rightward against biasing spring 50 thereby to open passages 46*a* and 46*b*. Upon this, due to the work of first electromagnetic switch valve 21, phase retarding hydraulic chambers 11 or phase advancing hydraulic chambers 12 are supplied with the hydraulic pressure turning vane member 9 in a desired direction.

Accordingly, like in the case of the above-mentioned second embodiment, vane member 9 can be stably and assuredly kept in a position in the way to the most-retarded phase position. Furthermore, due to usage of biasing spring 50 and pilot pressure for shifting spool member 9, electric power consumption of the valve timing control device can be reduced.

[Fourth Embodiment]

Figure 14:
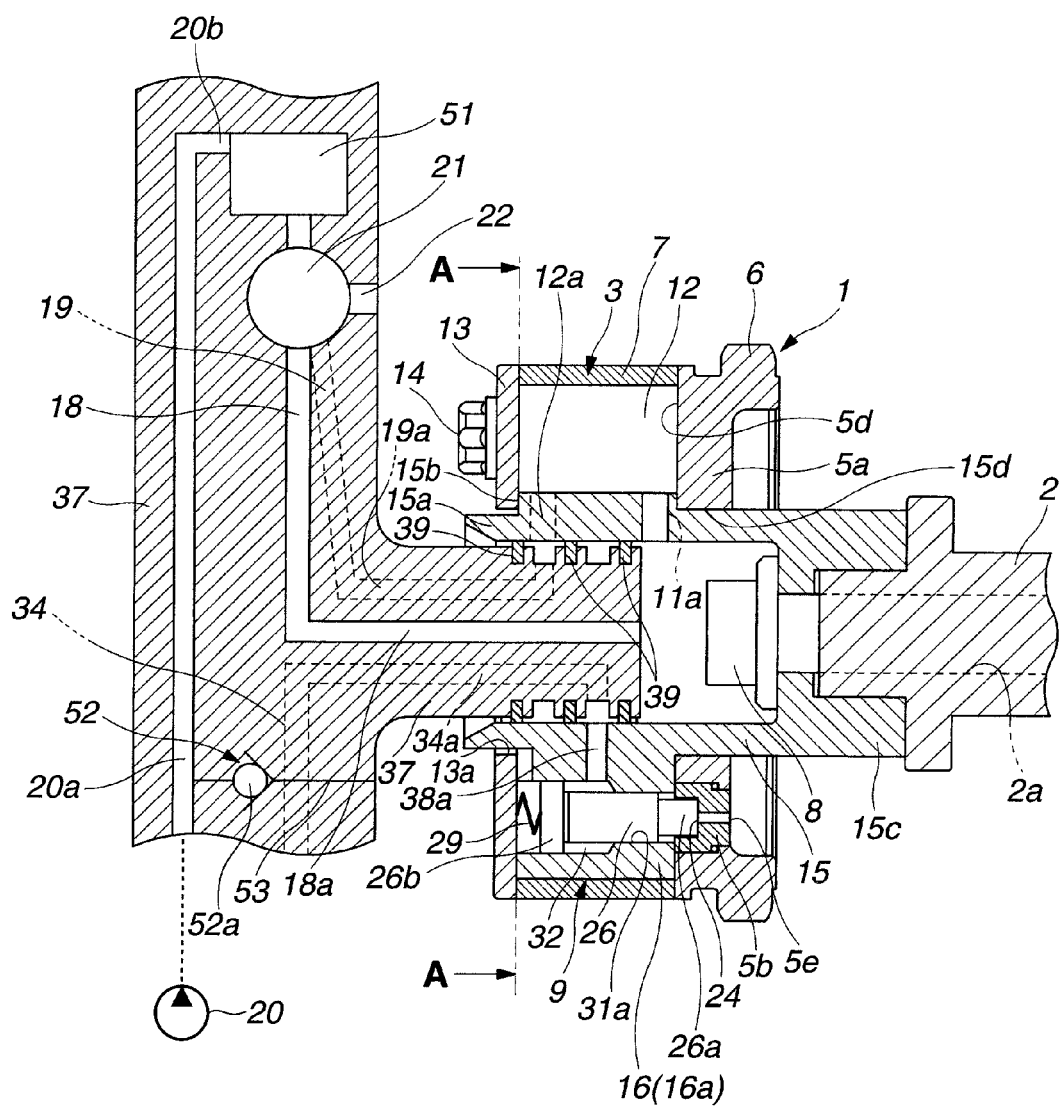
FIG. 14 is an enlarged sectional view of an essential part of a fourth embodiment of the present invention.

Referring to FIG. 14, there is shown a fourth embodiment of the present invention.

In this embodiment, the above-mentioned passage defining cylindrical body 37 is much effectively used. That is, as is seen from the drawing, first electromagnetic switch valve 21 and drain passage 22 are provided in the body 37 at a position higher than phase retarding and advancing hydraulic chambers 11 and 12 with respect to a direction (viz., the direction of gravity) in which the gravity is applied. Furthermore, at a position higher than first electromagnetic switch valve 21, there is provided a fluid reserving chamber 51 that is connected to discharge passage 20*a*. Furthermore, at a position downstream fluid reserving chamber 51 of discharge passage 20*a*, there is provided a normally open check valve 52 that is normally open but takes a closed position when the pressure in discharge passage 20*a* increases to a given level.

More specifically, the first electromagnetic switch valve 21 is of a type that is substantially the same as that 21 of the above-mentioned embodiments, and valve 21 and drain passage 22 are positioned sufficiently higher than phase retarding and advancing hydraulic chambers 11 and 12.

The fluid reserving chamber 51 is positioned higher than first electromagnetic switch valve 21, so that the chamber 51 temporarily reserves the working fluid supplied from discharge passage 20*a*, and fluid reserving chamber 51 has a downstream end connected to an inlet part of first electromagnetic switch valve 21. Furthermore, as shown, an inlet part of fluid reserving chamber 51 to which a downstream end 20*b* of discharge passage 20*a* is connected is provided at a higher position of chamber 51.

The check valve 52 is arranged in an open-air passage 53 that connects discharge passage 20*a* and the interior of the engine. The check valve 52 includes a check ball 52*a* that closes open-air passage 53 when the pressure in discharge passage 20*a* is equal to or higher than to a given level and opens open-air passage 53 when the pressure in discharge passage 20*a* is lower than the given level. It is to be noted that check valve 52 has not a so-called biasing spring that biases check ball 52*a* in the closing direction. That is, the open/close action of check valve 52 is effected by only the level of pressure in discharge passage 20*a*.

Accordingly, when, in this embodiment, the engine is stopped and thus oil pump 20 is also stopped, the pressure in discharge passage 20*a* becomes negative due to the stop of oil pump 20 and the difference in fluid head, and thus, check valve 52 opens open-air passage 53 thereby introducing a certain amount of open air into discharge passage 20*a*. With this, the working fluid in discharge passage 20*a* smoothly comes down in passage 20*a* and smoothly returns to oil pan 23.

It is to be noted that even when almost all of the working fluid in discharge passage 20*a* has returned to oil pan 23, fluid reserving chamber 51 holds therein a certain amount of working fluid. That is, since the inlet part (20*b*) of fluid reserving chamber 51 is provided at the higher position of the chamber 51, a sufficient amount of working fluid is left therein.

Accordingly, the working fluid in fluid reserving chamber 51 is led through first electromagnetic switch valve 21 into phase retarding hydraulic chambers 11 or phase advancing hydraulic chambers 12, and thus, these chambers 11 or 12 hold or keep the working fluid therein. Even when some leak of the working fluid takes place in first electromagnetic switch valve 21, the passages from the valve 21 and the chambers 11 or 12, the working fluid in fluid reserving chamber 51 is fed into the chambers 11 or 12. Accordingly, even when the engine is kept stopped for a long time, the vane member 9 can keep the most-retarded side position stably.

As is described hereinabove, even when the working fluid in the discharge passage 20a is discharged or drained, phase retarding hydraulic chambers 11 or phase advancing hydraulic chambers 12 can keep the working fluid therein. Accordingly, there is no need of energizing first electromagnetic switch valve 21 for closing the passage to the chambers 11 or 12. This means reduction in electric power consumption.

Furthermore, since check valve 52 is positioned closer to first electromagnetic switch valve 21 than oil pump 20 in the direction of gravity, the draining action to the working fluid in discharge passage 20a is smoothly and quickly made.

After starting the engine, the pressure in discharge passage 20a increases due to starting of oil pump 20, and thus, check valve 52 closes open-air passage 53, and at the same time, first electromagnetic switch valve 21 functions to connect one of retarding and advancing fluid passages 18 and 19 to discharge passage 20a and connect the other one of the passages 18 and 19 to drain passage 22. Furthermore, at the same time, the locked condition of vane member 9 by lock pin 26 or 27 is cancelled thereby permitting vane member 9 to turn in the phase advancing/retarding direction.

[Fifth Embodiment]

Referring to FIGS. 15 to 18, there is shown a fifth embodiment of the present invention.

The fifth embodiment is quite similar to the above-mentioned first embodiment.

However, in the fifth embodiment, there is employed a position keeping mechanism that is different in construction from that used in the first embodiment. Of course, the position keeping mechanism employed in the fifth embodiment functions to hold vane member at the most-retarded side position like in case of the first embodiment.

For ease of understanding, the position keeping mechanism used in the fifth embodiment will be named "modified position keeping mechanism".

Figure 15:
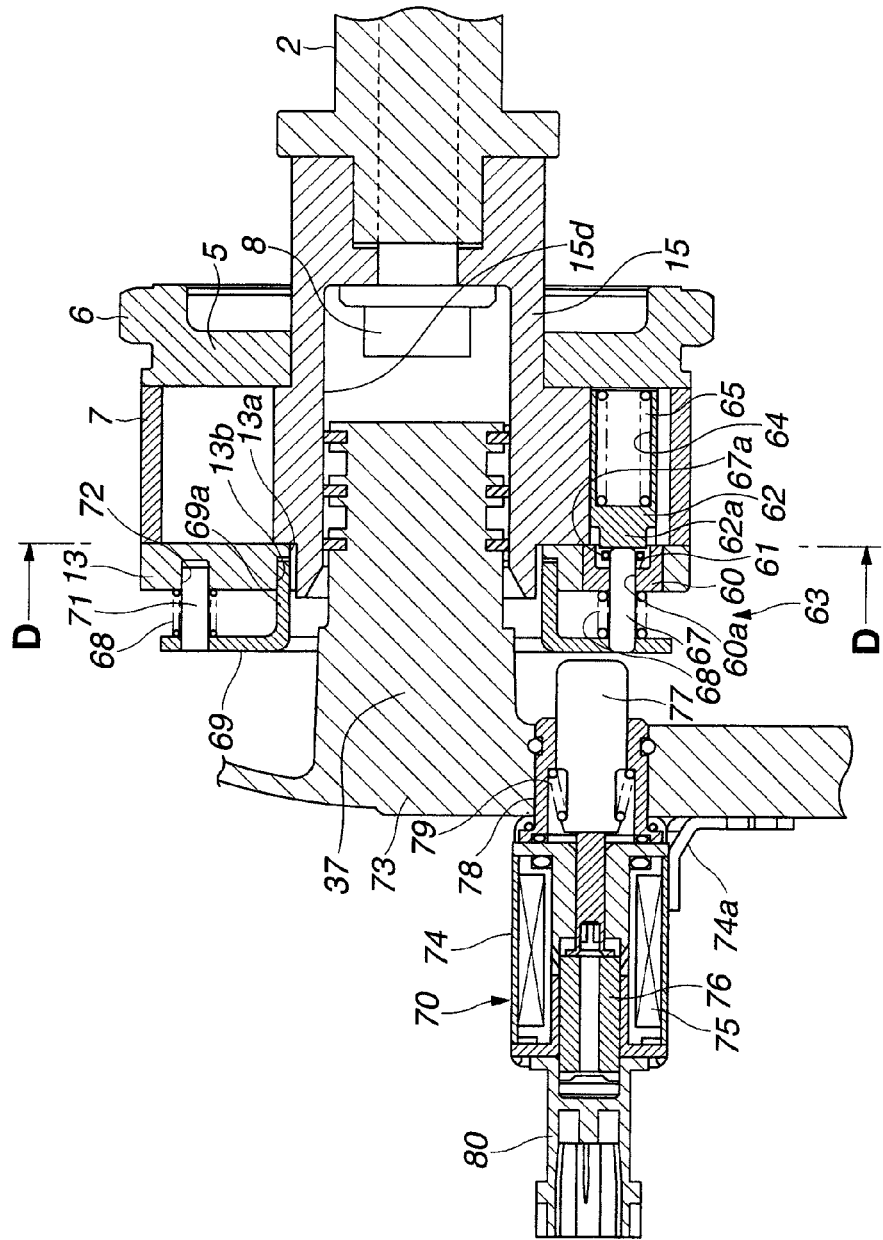
FIG. 15 is a view similar to FIG. 14, but showing an essential part of a fifth embodiment of the present invention.
Figure 17:
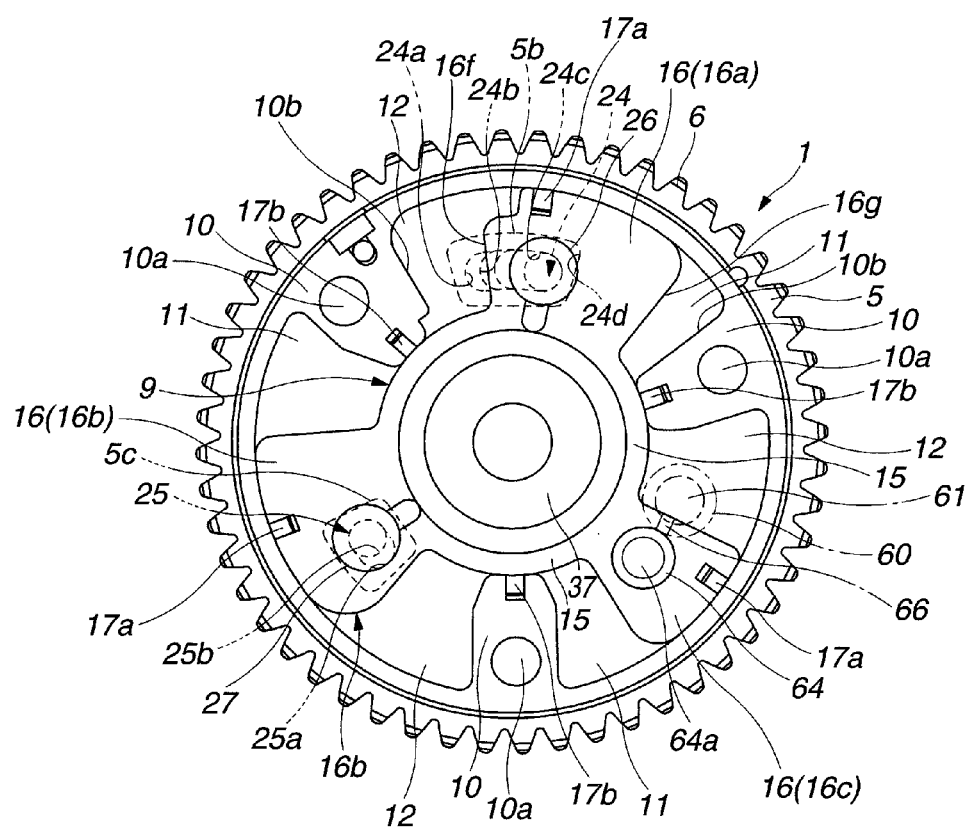
FIG. 17 is a sectional view taken along the line D-D of FIG. 15, showing a vane member taking an angular position for the middle phase.

As is seen from FIGS. 15 and 17, the modified position keeping mechanism comprises a third lock opening 61 possessed by an apertured member 60 that is provided in the annular front cover 13 at predetermined position in a circumferential direction, a third lock pin 62 that is axially movable in a bore formed in smaller vane 16c of vane member 9 and engageable with the third lock opening 61, and a cancelling mechanism 63 that functions to cancel the engagement between third lock pin 62 and third lock opening 61. As is seen from FIG. 17, the smaller vane 16c of this fifth embodiment is somewhat larger than that 16c of the above-mentioned first embodiment (see FIG. 2).

As is seen from FIGS. 15 and 17, third lock opening 61 is shaped substantially cylindrical and has a given depth. It is to be noted that third lock opening 61 is shaped to constitute a pressure chamber that is an element of cancelling mechanism 63. As shown in FIG. 15, apertured member 60 has a through pin bore 60a in which an after-mentioned press pin 67 is slidably received.

The third lock pin 62 is slidably received in a third pin bore 64 formed in smaller vane 16c of vane member 9, and has a smaller diameter leading end 62a that is engageable with third lock opening 61. Between a bottom of a bore formed in third lock pin 62 and an inside surface of sprocket body 5, there is compressed a coil spring 65 for biasing third lock pin 62 in a direction to engage with third lock opening 61.

It is to be noted that cancelling mechanism 63 comprises two cancelling units which are first and second cancelling units.

Figure 18:
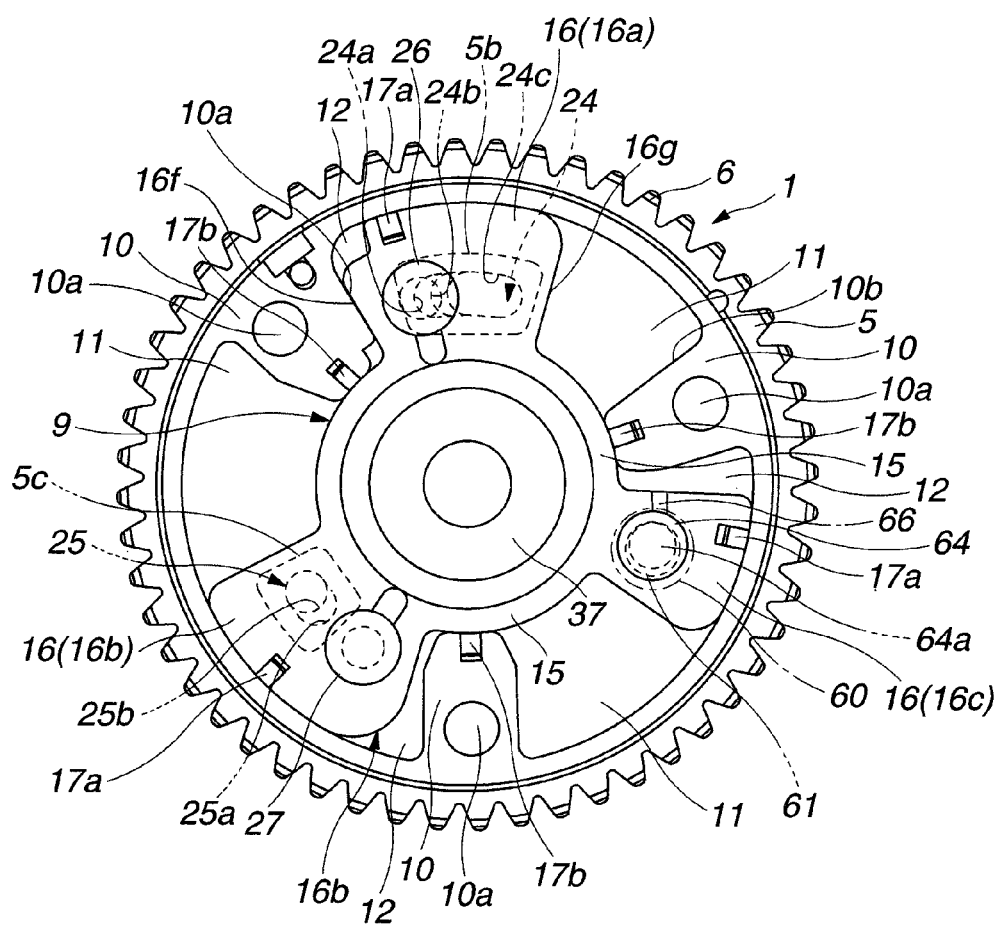
FIG. 18 is a view similar to FIG. 17, but showing the vane member taking an angular position for the most-retarded phase.

As is seen from FIG. 18, in the first cancelling unit, there is provided a connecting groove 66 that is formed in smaller vane 16c to connect third lock opening 61, which serves as the pressure chamber (61), with one of the three phase advancing hydraulic chambers 12. With such connecting groove 66, the working fluid fed to the phase advancing hydraulic chamber 12 is led through connecting groove 66 to the pressure chamber (61) thereby to urge third lock pin 62 in the lock-cancelling direction against coil spring 65.

Figure 16:
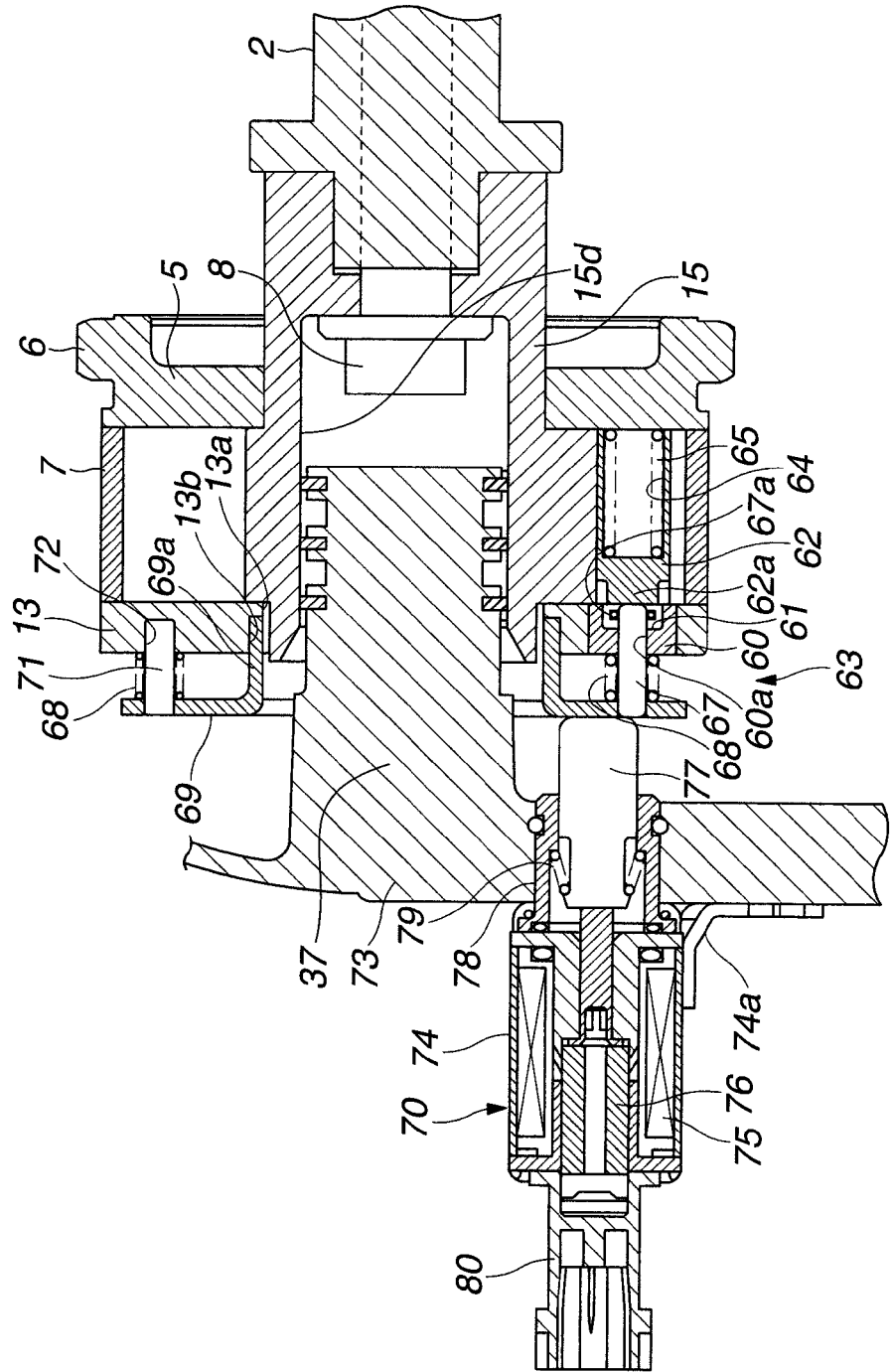
FIG. 16 is a view similar to FIG. 15, but showing a different condition of the essential part of the fifth embodiment of the present invention.

As is seen from FIGS. 15 and 16, the second cancelling unit generally comprises a press pin 67 that is slidably received in through pin bore 60a and projectable into third lock opening 61, three second coil springs 68 that are arranged to bias press pin 67 in a direction away from third lock opening 61, an annular plate 69 that is connected to a rear end of press pin 67 to move therewith, and an electric solenoid 70 that is constructed to move third lock pin 62 away from third lock opening 61 by pressing press pin 67 against third lock pin 62 through annular plate 69 against the biasing force of three second coil springs 68.

The three second coil springs 68 are disposed about press pin 67 and after-mentioned two guide pins 71 respectively. The coil spring 68 disposed about press pin 67 has a right end pressed against an outside surface of apertured member 60 and a left end pressed against an inner wall of annular plate 69, and the other two coil springs 68 disposed about two guide pins 71 have each a right end pressed against an outer surface of annular front cover 13 and a left end pressed against the inner surface of annular plate 69.

A stop ring 67a is fixed to a leading end of press pin 67 for suppressing disengagement of press pin 67 from third lock opening 61.

The annular plate 69 is made of a pressed metal plate and arranged concentric with axially extending cylindrical bore 15d of vane rotor 15. The above-mentioned press pin 67 and the two guide pins 71 have each a left end fixed to the annular plate 69. It is to be noted that the three pins 67, 71 and 71 are arranged at equally spaced intervals, that is, at three positions spaced from one another by 120 degrees. The two guide pins 71 are used for making a smoothed axial movement of annular plate 69 and have right ends slidably received in guide bores 72 formed in annular front cover 13.

The annular plate 69 is integrally formed with a cylindrical inner guide portion 69a that is slidably inserted into an annular groove 13b formed on a cylindrical inner surface of circular opening 13a of front cover 13. With this construction, the axial movement of annular plate 69 is guided by the sliding engagement between guide portion 69a and the annular groove 13b.

As shown in FIG. 15, electric solenoid 70 comprises a cylindrical body 74 that is fixed through brackets 74a to a cover 73 integral with passage defining cylindrical body 37, an electric coil 75 that is tightly disposed in cylindrical body 74, a plunger 76 that is axially movably received in electric coil 75, a press piston 77 that is slidably supported by a cylindrical supporting member 78 fixed to a right end of cylindrical body 74 and tightly received in a bore formed in cover 73 and functions to press annular plate 69 with the aid of plunger 76, and a valve spring 79 that is received in cylindrical supporting member 78 to bias press piston 77 leftward, that is, in a direction away from annular plate 69.

As shown, to a left end of cylindrical body 74, there is connected an electric connector 80.

Accordingly, when the engine is stopped, vane member 9 is turned to the most-retarded side position by the above-mentioned operation. Under this condition, energization of electric coil 75 is kept suppressed. Accordingly, press piston 77 takes a rest position due to the work of valve spring 79. Accordingly, as is seen from FIG. 15, leading end 62a of third lock pin 62 is engaged with third lock opening 61. Accordingly, vane member 9 is stably and assuredly held at the most-retarded side position.

Accordingly, like in case of the above-mentioned first to fourth embodiments, startability of the engine at the time when the engine temperature is low is improved. That is, engine turning at an initial stage of cranking is improved, and undesired flap of vane member 9 caused by the alternating torque produced at the restarting of the engine is suppressed or at least minimized.

In the second cancelling unit, even if a satisfied amount of hydraulic pressure is not prepared, the locked condition of third lock pin 62 can be cancelled by the electric power. Thus, in operation, upon starting of the engine, electric coil 75 is energized to move press piston 77 rightward against springs 68 and 79. Upon this, annular plate 69 is moved rightward along guide pins 71 causing press pin 67 to press third lock pin 62 thereby disengaging leading end 62a of lock pin 62 from third lock opening 61. With this, vane member 9 becomes free in rotation. Other operation is substantially the same as that in the above-mentioned first embodiment.

The entire contents of Japanese Patent Application 2010-162433 filed Jul. 20, 2010 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A valve timing control device of an internal combustion engine, comprising:
   a drive rotation member driven by a crankshaft of the engine;
   a driven rotation member fixed to a camshaft that actuates engine valves to open and close, the drive rotation member and driven rotation member being coaxially arranged to make a relative rotation therebetween;
   a phase varying mechanism including a phase retarding hydraulic chamber, a phase advancing hydraulic chamber, the phase retarding and advancing hydraulic chambers being defined between the drive and driven rotation members, and a hydraulic pressure control valve that selectively controls the hydraulic pressure in the phase retarding hydraulic chamber and the hydraulic pressure in the phase advancing hydraulic chamber thereby to rotate the driven rotation member relative to the drive rotation member in either one of phase retarding and advancing directions;
   a lock mechanism including a lock member that is provided by one of the drive and driven rotation members and movable forward and rearward in accordance with an operation condition of the engine, and a lock opening that is provided by the other of the drive and driven rotation members and engageable with the lock member when the driven rotation member takes a middle phase position relative to the drive rotation member; and
   a position keeping mechanism to selectively keep the driven rotation member at either one of the most-retarded phase position and the middle phase position relative to the drive rotation member in accordance with an engine start condition, selection of one of the most-retarded phase position and the middle phase position being carried out by controlling a working fluid that flows between one of the phase retarding and advancing hydraulic chambers and the hydraulic pressure control valve, wherein:
   when the driven rotation member is kept at the most-retarded phase position relative to the drive rotation member, at least one of the phase retarding and advancing hydraulic chambers contains therein the working fluid,
   when the driven rotation member is kept at a middle phase position between the most-retarded phase position and the most-advanced phase position relative to the drive rotation member, the lock member and the lock opening are engaged, and
   when the engine is at a standstill, the flow of the working fluid between one of the phase retarding and advancing hydraulic chambers, which contains therein the working fluid when the driven rotation member takes the most-retarded phase position, and the hydraulic pressure control valve, is restricted.

2. A valve timing control device of an internal combustion engine as claimed in claim 1, in which the hydraulic pressure control valve is of an electric type wherein:
   when
   the hydraulic pressure control valve is energized upon stopping of the engine, the control for keeping the working fluid in one of the phase retarding and advancing hydraulic chambers with the driven rotation member taking the most-retarded phase position, is continued for a given time, and
   when, upon expiration of the given time, the energization of the hydraulic pressure control valve is stopped thereby to discharge the working fluid that has been contained in one of the phase retarding and advancing hydraulic chambers.

3. A valve timing control device of an internal combustion engine as claimed in claim 2, in which the hydraulic pressure control valve is arranged at a position higher than the phase retarding and advancing hydraulic chambers with respect to a direction of gravity.

4. A valve timing control device of an internal combustion engine as claimed in claim 3, in which a fluid reserving chamber is provided at a position higher than the hydraulic pressure control valve with respect to the direction of gravity, the fluid reserving chamber being connected to the phase retarding and advancing hydraulic chambers.

5. A valve timing control device of an internal combustion engine as claimed in claim 3, in which an oil pump for feeding the hydraulic pressure control valve with the working fluid is provided at a position lower than the hydraulic pressure control valve with respect to the direction of gravity, and a normally open check valve is provided in a discharge passage of the oil pump at a position between the oil pump and the hydraulic pressure control valve, the normally open check valve taking an open position to communicate the interior of the discharge passage with the open air when the oil pump is stopped and taking a close position to shut the communication with the open air when the oil pump is operated.

6. A valve timing control device of an internal combustion engine as claimed in claim 5, in which the normally open check valve is positioned nearer to the hydraulic pressure control valve than the oil pump with respect to the direction of gravity.

7. A valve timing control device of an internal combustion engine as claimed in claim 5, in which the normally open check valve comprises a check ball that has no mechanical means for biasing the check ball toward the close position, the check ball taking the close position when receiving a certain level of the discharge pressure from the oil pump.

8. A valve timing control device of an internal combustion engine as claimed in claim 1, further comprising a restricting means which, when the engine is stopped, restricts the fluid communication between the hydraulic pressure control valve and at least one of the first group of phase retarding hydraulic chamber and the phase advancing hydraulic chamber, and when the engine is started, cancels the restricted fluid communication.

9. A valve timing control device of an internal combustion engine as claimed in claim 8, in which the restricting means is a switch valve that is arranged in fluid passages that connect the hydraulic pressure control valve with at least one of the first group of phase retarding hydraulic chambers and the second group of phase advancing hydraulic chambers, the switch valve including a spool member of which one end is applied with, as a pilot pressure, the discharge pressure from the oil pump at a position upstream relative to the hydraulic pressure control valve and a biasing member that biases the spool member in a direction to close the fluid passages, the spool member opening the fluid passages when the pilot pressure increases to a given level.

10. A valve timing control device of an internal combustion engine as claimed in claim 1, in which the position keeping mechanism selects the phase keep position in accordance with a temperature of the engine at the engine starting.

11. A valve timing control device of an internal combustion engine as claimed in claim 1, in which the position keeping mechanism is electrically operated in accordance with a temperature of the engine detected by a temperature sensor.

12. A valve timing control device of an internal combustion engine as claimed in claim 1, in which when the engine is stopped by turning the ignition switch off, the driven rotation member is turned to and held at the middle phase position, and when the engine is automatically stopped without the aid of the ignition switch, the driven rotation member is turned to and held at the most-retarded phase position.

* * * * *